United States Patent
Meyer et al.

(10) Patent No.: US 9,864,519 B2
(45) Date of Patent: Jan. 9, 2018

(54) PERFORMING WRITE OPERATIONS IN A NETWORK ON A CHIP DEVICE

(71) Applicant: KnuEdge Incorporated, San Diego, CA (US)

(72) Inventors: Doug Meyer, San Diego, CA (US); Jerry Coffin, San Diego, CA (US); Andy White, Austin, TX (US)

(73) Assignee: KnuEdge Incorporated, San Diego, CA (US)

( * ) Notice: Subject to any disclaimer, the term of this patent is extended or adjusted under 35 U.S.C. 154(b) by 196 days.

(21) Appl. No.: 14/834,249

(22) Filed: Aug. 24, 2015

(65) Prior Publication Data
US 2017/0060420 A1    Mar. 2, 2017

(51) Int. Cl.
| | | |
|---|---|---|
| G06F 12/00 | (2006.01) | |
| G06F 3/06 | (2006.01) | |
| H04L 29/08 | (2006.01) | |
| H04L 12/861 | (2013.01) | |
| H04L 12/721 | (2013.01) | |

(52) U.S. Cl.
CPC .......... *G06F 3/0604* (2013.01); *G06F 3/0659* (2013.01); *G06F 3/0673* (2013.01); *H04L 67/00* (2013.01); *H04L 45/72* (2013.01); *H04L 49/9068* (2013.01)

(58) Field of Classification Search
CPC .... G06F 3/0604; G06F 3/0659; G06F 3/0673; G06F 12/109; G06F 2212/657; H04L 45/72; H04L 493/063
See application file for complete search history.

(56) References Cited

U.S. PATENT DOCUMENTS

| | | | | |
|---|---|---|---|---|
| 7,620,693 | B1 * | 11/2009 | Mott | H04L 47/621 709/213 |
| 7,813,369 | B2 * | 10/2010 | Blackmore | H04L 67/1097 370/429 |
| 8,655,815 | B2 | 2/2014 | Palmer | |
| 8,848,726 | B1 | 9/2014 | Palmer | |
| 9,069,672 | B2 * | 6/2015 | Abts | G06F 12/0813 |
| 2005/0198032 | A1 * | 9/2005 | Cochran | G06F 3/0614 |
| 2011/0153884 | A1 * | 6/2011 | Shimotaya | G06F 3/0611 710/106 |
| 2014/0032457 | A1 | 1/2014 | Palmer | |
| 2014/0156907 | A1 | 6/2014 | Palmer | |
| 2014/0204943 | A1 | 7/2014 | Palmer | |
| 2016/0006808 | A1 * | 1/2016 | Shrader | H04L 49/109 709/213 |

OTHER PUBLICATIONS

Bedeir, Tarick. RDMA Read and Write with IB Verbs. Technical report, HPC Advisory Council, 2010.*

* cited by examiner

*Primary Examiner* — David X Yi
*Assistant Examiner* — Francisco Grullon
(74) *Attorney, Agent, or Firm* — Fish & Richardson P.C.

(57) ABSTRACT

Systems and methods are provided for performing write-with-response operations in a network on a chip architecture. In response to receiving an instruction to perform a write-with-response operation, a writer computing resource of a computing system (implemented using the network on a chip architecture) executes this instruction by performing a write operation for writing data to a memory location followed by a response operation for notifying a notification target computing resource of the computing system that the data has been written to the memory location.

44 Claims, 20 Drawing Sheets

PERFORMING WRITE OPERATIONS IN A NETWORK ON A CHIP DEVICE

FIELD OF THE DISCLOSURE

The systems, methods and apparatuses described herein relate to writing to memory in a computing system that has a plurality of computing resources, where communication between the computing resources is carried out based on a network on a chip architecture.

BACKGROUND

In a network on a chip device, there is frequent need for a processing element to write data, then take actions (or instruct other processing elements to take action) upon that data. Due to the network on a chip architecture, however, delivery order of packets carrying the data and/or instructions for processing the data may not be guaranteed. Simply sending a packet with the data to be written, then sending a second packet to indicate that the data has been written is insufficient to ensure that the data has actually been written before the second packet arrives at a destination. If the packets arrive out of order at their respective destinations, a notification destination could be signaled that data has been written at a write destination before the data has actually arrived to be written at the write destination.

For this reason, once a processing element sent data to be written to a memory location, the processing element follows up by reading data from the written location to verify that the write has occurred. This is done both when configuring registers within a single network on a chip device and when writing registers in another network on a chip device.

SUMMARY

In this specification, technologies are disclosed for performing write-with-response operations. In response to receiving an instruction to perform a write-with-response operation, a writer computing resource of a computing system executes this instruction by performing a write operation for writing data to a memory location followed by a response operation for notifying a notification target computing resource of the computing system that the data has been written to the memory location. The response operation can be performed once the write operation has been committed. In accordance with the disclosed technologies, a packet is encoded to include data to be written to a recipient computing resource of the computing system and a response packet to be transmitted by the recipient computing resource to the notification target computing resource when certain conditions are satisfied. The response packet can be sent to any notification target computing resource in the computing system, not necessarily back to the originator computing resource that originated the packet. This capability can be used by a processing element to transmit data to an intermediary processing element to be processed by another processing element, as the intermediary processing element will forward the response packet to the other processing element to signal the other processing element to process the transmitted data.

In one aspect of the disclosure, a method includes (a) receiving a first packet, from a first computing resource at a second computing resource, where the first computing resource and the second computing resource are among a plurality of computing resources of a computing system. Here, the first packet includes (i) first data, and (ii) data specifying instructions for the second computing resource to write the first data to memory associated with the second computing resource, and to notify a notification target computing resource from among the plurality of computing resources of the computing system once the first data has been written to the memory associated with the second computing resource. The method further includes (b) writing, by the second computing resource, the first data to the memory associated with the second computing resource; and (c) subsequent to the first data having been written to the memory associated with the second computing resource, transmitting a response packet, by the second computing resource to the notification target computing resource. Here, the response packet includes data specifying that the first data has been written to memory associated with the second computing resource.

These and other implementations can include one or more of the following features. In some implementations, the notification target computing resource can be the first computing resource. In some implementations, the notification target computing resource can be a third computing resource that is different from the first computing resource.

In some implementations, the first computing resource can be an intermediary computing resource chained between an originator computing resource and the second computing resource, the originator computing resource having provided to the first computing resource at least the first data and additional data, and each of the first packet received by the second computing resource from the first computing resource and the response packet transmitted by the second computing resource to the notification target computing resource further can include data specifying that the additional data has been written to memory associated with the first computing resource.

In some implementations, the method further includes (d) subsequent to the first data having been written to the memory associated with the second computing resource, transmitting a second packet, by the second computing resource to a third computing resource from among the plurality of computing resources, the second computing resource being chained between the first computing resource and the third computing resource. Here, each of the first packet and the second packet includes (iii) second data, and (iv) data specifying instructions for the third computing resource to write the second data to memory associated with the third computing resource, and to notify a second notification target computing resource from among the plurality of computing resources when the second data has been written to the memory associated with the third computing resource. In some of these implementations, each of the first packet and the second packet includes data specifying an instruction for the third computing resource to notify the second notification target computing resource that the first data has been written to the memory associated with the second computing resource. In some of these implementations, each of the notification target computing resource and the second notification target computing resource can be the first computing resource. Alternatively in some of these implementations, each of the notification target computing resource and the second notification target computing resource can be different from the first computing resource.

In some implementations, the data specifying that the first data has been written to memory associated with the second computing resource can specify that the first data will have or has been written to a memory location associated with the second computing resource before that memory location is next read and/or side effects of the data which will have or has been written to the memory are utilized. In some implementations, the writing of the first data to the memory associated with the second computing resource can include queueing the first data for writing or committing the writing.

In some implementations, the plurality of computing resources of the computing system can include one or more controllers of one or more processing devices included in the computing system, a plurality of processing engines of the one or more processing devices, and one or more memory controllers of cluster memory of the one or more processing devices.

In some implementations, both the first packet and the response packet can include additional data, and data specifying an instruction for the notification target computing resource to write the additional data to memory associated with the notification target computing resource. In some implementations, the response packet can include an address corresponding to the memory associated with the second computing resource to which the first data has been written. Here, the first packet can include the address corresponding to the memory associated with the second computing resource to which the first data is to be written.

In another aspect of the disclosed technologies, a computing apparatus includes one or more hardware processors; and non-transitory computer-readable medium encoding instructions that, when executed by the one or more hardware processors, cause the computing apparatus to perform operations including (a) receive a first packet, from a first computing apparatus communicatively coupled with the computing apparatus. Here, the first packet includes (i) first data, and (ii) data specifying instructions to write the first data to memory associated with the computing apparatus, and to notify a notification target computing apparatus communicatively coupled with the computing apparatus once the first data has been written to the memory associated with the computing apparatus. The operations further include (b) write the first data to the memory associated with the computing apparatus; and (c) subsequent to the first data having been written to the memory associated with the second computing resource, transmit a response packet to the notification target computing apparatus. Here, the response packet includes data specifying that the first data has been written to memory associated with the computing apparatus.

These and other implementations can include one or more of the following features. In some implementations, the notification target computing apparatus can be the computing apparatus. In some implementations, the notification target computing apparatus can be a third computing apparatus that is different from the first computing apparatus.

In some implementations, each of the first packet and the response packet further can include data specifying that additional data has been written to memory associated with the first computing apparatus, and the additional data has been provided to the first computing apparatus by an originator computing apparatus.

In some implementations, the operations can include (d) transmit, subsequent to the first data having been written to the memory associated with the computing apparatus, a second packet to a third computing apparatus communicatively coupled with the computing apparatus. Here, each of the first packet and the second packet can include (iii) second data, and (iv) data specifying instructions for the third computing apparatus to write the second data to memory associated with the third computing apparatus, and to notify a second notification target computing apparatus when the second data has been written to the memory associated with the third computing apparatus. In some of these implementations, each of the first packet and the second packet can include data specifying an instruction for the third computing apparatus to notify the second notification target computing apparatus that the first data has been written to the memory associated with the computing apparatus. In some of these implementations, each of the notification target computing apparatus and the second notification target computing apparatus can be the first computing resource. Alternatively in some of these implementations, each of the notification target computing apparatus and the second notification target computing apparatus can be different from the first computing apparatus.

In some implementations, the data specifying that the first data has been written to memory associated with the computing apparatus can specify that the first data will have or has been written to a memory location associated with the computing apparatus before that memory location is next read and/or side effects of the data which will have or has been written to the memory are utilized. In some implementations, the operation of writing the first data to the memory associated with the computing apparatus can include queueing the first data for writing or initiate the writing.

In some implementations, the computing apparatus can be configured either as a controller of a processing device included in a computing system, a processing engine of the processing device, or a memory controller of cluster memory of the processing device.

In some implementations, both the first packet and the response packet can include additional data, and data specifying an instruction for the notification target computing apparatus to write the additional data to memory associated with the notification target computing apparatus. In some implementations, the response packet can include an address corresponding to the memory associated with the computing apparatus to which the first data has been written. Here, the first packet can include the address corresponding to the memory associated with the computing apparatus to which the first data is to be written.

In yet another aspect of the disclosed technologies, a computing system includes a plurality of computing resources; and memory associated with respective ones of the computing resources. Here, a first computing resource of the plurality of computing resources is communicatively coupled with a second computing resource of the plurality of computing resources, and the second computing resource is communicatively coupled with a notification target computing resource of the plurality of computing resources. Further, the second computing resource is configured to (a) receive a first packet from the first computing resource. The first packet includes (i) first data, and (ii) data specifying instructions to write the first data to memory associated with the second computing resource, and notify the notification target computing resource once the first data has been written to the memory associated with the second computing resource. Furthermore, the second computing resource is configured to (b) write the first data to the memory associated with the second computing resource; and (c) subsequent to the first data having been written to the memory associated with the second computing resource, transmit a response packet to the notification target computing resource, the response packet comprising data specifying that the first data has been written to memory associated with the second computing resource.

These and other implementations can include one or more of the following features. In some implementations, the notification target computing resource can be the first computing resource. In some of these implementations, the first computing resource is a first processing engine of a plurality of processing engines of the computing system, and the second computing resource is a memory controller of cluster memory of the computing system.

In some implementations, the notification target computing resource is a third computing resource that is different from the first computing resource. In some of these implementations, the first computing resource is a first processing engine of a plurality of processing engines of the computing system, the second computing resource is a memory controller of cluster memory of the computing system, and the third computing resource is a second processing engine of the plurality of processing engines.

In some implementations, the first computing resource can be an intermediary computing resource that is communicatively coupled with an originator computing resource from among the plurality of computing resources, the originator computing resource having provided to the first computing resource at least the first data and additional data, and each of the first packet and the response packet further can include data specifying that the additional data has been written to memory associated with the first computing resource. In some of these implementations, each of the first computing resource and the second computing resource is a respective memory controller of a respective cluster memory of the computing system.

In some implementations, the second computing resource can be communicatively coupled with a third computing resource of the plurality of computing resources, and the third computing resource is communicatively coupled with a second notification target computing resource of the plurality of computing resources. Moreover, the second computing resource is further configured to (d) transmit, subsequent to the first data having been written to the memory associated with the second computing resource, a second packet to the third computing resource. Here, each of the first packet and the second packet can include (iii) second data, and (iv) data specifying instructions for the third computing resource to write the second data to memory associated with the third computing resource, and to notify the second notification target computing resource when the second data has been written to the memory associated with the third computing resource. In some of these implementations, each of the first packet and the second packet can include data specifying an instruction for the third computing resource to notify the second notification target computing resource that the first data has been written to the memory associated with the second computing resource. In some of these implementations, each of the notification target computing resource and the second notification target computing resource can be the first computing resource. Alternatively in some of these implementations, each of the notification target computing resource and the second notification target computing resource can be different from the first computing resource.

In some implementations, the data specifying that the first data has been written to memory associated with the second computing resource can specify that the first data will have or has been written to a memory location associated with the second computing resource before that memory location is next read and/or side effects of the data which will have or has been written to the memory are utilized. In some implementations, to write the first data to the memory associated with the second computing resource, the second computing resource can be configured to queue the first data for writing or initiate the writing.

In some implementations, both the first packet and the response packet can include additional data, and data specifying an instruction for the notification target computing resource to write the additional data to memory associated with the notification target computing resource. In some implementations, the response packet can include an address corresponding to the memory associated with the second computing resource to which the first data has been written. Here, the first packet can include the address corresponding to the memory associated with the second computing resource to which the first data is to be written.

In some implementations, the plurality of computing resources of the computing system can include one or more controllers of one or more processing devices included in the computing system, a plurality of processing engines of the one or more processing devices, and one or more memory controllers of cluster memory of the one or more processing devices. In some implementations, at least a portion of the computing system is implemented as a system on a chip (SoC). In some implementations, at least one computing resource of the plurality of computing resources is implemented as a microprocessor, a microcontroller, a field programmable gate array (FPGA) or an application specific integrated circuit (ASIC).

Particular aspects of the disclosed technologies can be implemented so as to realize one or more of the following potential advantages. For example, performing the disclosed write-with-response operation involves at least 33% fewer communications within network on a chip architecture than conventionally performing a write operation followed by a read operation. For the case where the write operation is to be performed on another network on a chip device, the benefit is greater still since packet ordering for communication between network on a chip devices may not be guaranteed. In these cases, a packet instructing the read operation must be delayed sufficiently to guarantee that this read packet cannot arrive ahead of a packet instructing the write operation (or else multiple packets instructing the read operation will have to send until a desired read value is returned).

In addition to reducing packet traffic, the disclosed technologies simplify a programming model for the foregoing use pattern, and improve performance of a computing system in which computing resources communicate using network on a chip architecture.

Details of one or more implementations of the disclosed technologies are set forth in the accompanying drawings and the description below. Other features, aspects, descriptions and potential advantages will become apparent from the description, the drawings and the claims.

Figure 1A:
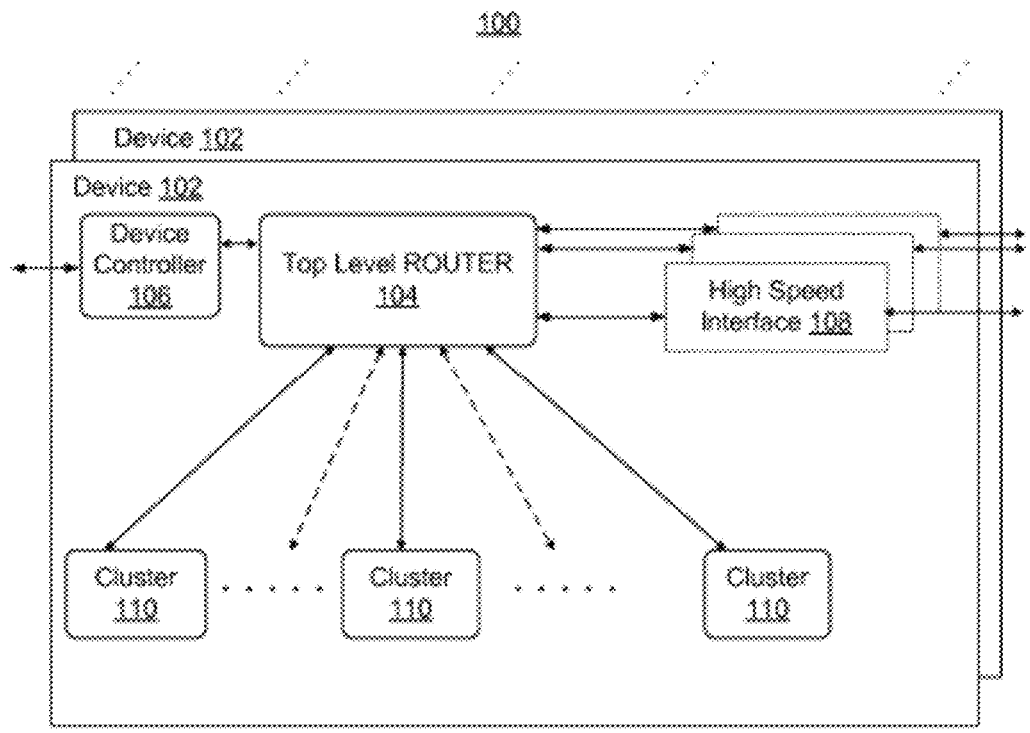
FIG. 1A is a block diagram of an example of a computing system.

Certain illustrative aspects of the systems, apparatuses, and methods according to the disclosed technologies are described herein in connection with the following description and the accompanying figures. These aspects are, however, indicative of but a few of the various ways in which the principles of the disclosed technologies may be employed and the disclosed technologies are intended to include all such aspects and their equivalents. Other advantages and novel features of the disclosed technologies may become apparent from the following detailed description when considered in conjunction with the figures.

DETAILED DESCRIPTION

Technologies are described for performing write-with-response operations in a network on a chip architecture. In some implementations, an originator processing element of a network on a chip device transmits a first packet including data to be written to a data destination and a header indicating the data destination to which the data will be written as well as an opcode to indicate an operation to be executed at the data destination. In addition, the first packet includes a second header (and optionally a payload) to designate where to send, by a destination processing element associated with the data destination, a response packet indicating that the indicated operation has completed, such that any subsequent operations will see a machine state of the data destination, accordingly. The destination processing element can send back the response packet to the originator processing element, or can send the response packet to another notification target processing element that needs to process the data that has now been made available at the data destination.

This establishes an ordering, assuring that the first packet arrives at the data destination first, and the response packet arrives at the notification target processing element later. The notification target processing element can take one or more actions in response to receiving the response packet, and be assured that the data from the first packet is available at the data destination.

The response packet included in the first packet could be of the same type as the first packet, so that when the response packet is received at the notification target processing element, a second response packet is transmitted to another notification target processing element, possibly separate from either the originator processing element or the destination processing element. This action chain can be repeated up to a limit imposed by the network on a chip architecture on packet size, so a single starting transmission can initiate an entire series of actions, in a predefined order. Although these actions are initiated in order, the processing associated with each action may (and typically will) proceed in parallel with the processing associated with other actions, both earlier and later in the action chain. In this way, a large number of actions in parallel can be carried out in accordance with the network on a chip architecture, using minimum level of serialization necessary to ensure that processing of data is only initiated after the data to be processed has been made available at a respective destination and it is ready for use.

Prior to describing example implementations of the disclosed technologies for performing write-with-response operations by computing resources of a computing system, where communication between the computing resources is carried out based on network on a chip architecture, structural aspects and functional aspects of the computing system and of the computing resources are described first.

FIG. 1A shows an exemplary computing system 100 according to the present disclosure. The computing system 100 includes at least one processing device 102. A typical computing system 100, however, may include a plurality of processing devices 102. In some implementations, each processing device 102, which may also be referred to as device 102, includes a router 104, a device controller 106, a plurality of high speed interfaces 108 and a plurality of clusters 110. The router 104 may also be referred to as a top level router or a level one router. Each cluster 110 includes a plurality of processing engines to provide computational capabilities for the computing system 100. In some implementations, the high speed interfaces 108 include communication ports to communicate data outside of the device 102, for example, to other devices 102 of the computing system 100 and/or interfaces to other computing systems. Unless specifically expressed otherwise, data as used herein may refer to both program code and pieces of information upon which the program code operates.

In some implementations, the processing device 102 includes 2, 4, 8, 16, 32 or another number of high speed interfaces 108. Each high speed interface 108 may implement a physical communication protocol. For example, each high speed interface 108 implements the media access control (MAC) protocol, and thus may have a unique MAC address associated with it. The physical communication may be implemented in a known communication technology, for example, Gigabit Ethernet, or any other existing or future-developed communication technology. For example, each high speed interface 108 implements bi-directional high-speed serial ports, such as 10 Giga bits per second (Gbps) serial ports. Two processing devices 102 implementing such high speed interfaces 108 may be directly coupled via one pair or multiple pairs of the high speed interfaces 108, with each pair including one high speed interface 108 on one processing device 102 and another high speed interface 108 on the other processing device 102.

Figure 5:
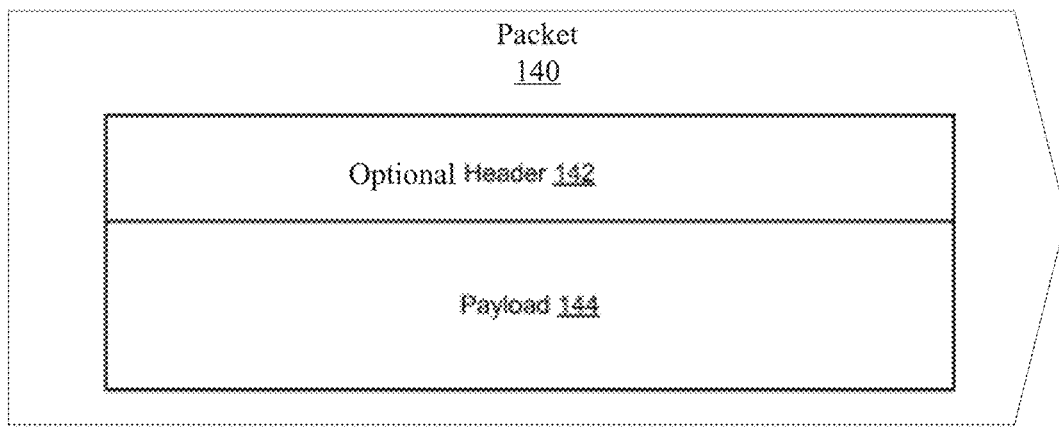
FIG. 5 is a block diagram of an example of a packet used to address a computing resource of a computing system.

In accordance with network on a chip architecture, data communication between different computing resources of the computing system 100 is implemented using routable packets. The computing resources include device level resources such as a device controller 106, cluster level resources such as a cluster controller or cluster memory controller, and/or the processing engine level resources such as individual processing engines and/or individual processing engine memory controllers. An example of a routable packet 140 (or simply packet 140) is shown in FIG. 5. The packet 140 includes a header 142. Optionally, the packet also includes a payload 144. The header 142 includes a routable destination address for the packet 140. The router 104 may be a top-most router configured to route packets on each processing device 102. In some implementations, the router 104 is a programmable router. That is, the routing information used by the router 104 may be programmed and updated. In some cases, the router 104 is implemented using an address resolution table (ART) or Look-up table (LUT) to route any packet it receives on the high speed interfaces 108, or any of the internal interfaces interfacing the device controller 106 or clusters 110. For example, depending on the destination address, a packet 140 received from one cluster 110 may be routed to a different cluster 110 on the same processing device 102, or to a different processing device 102; and a packet 140 received from one high speed interface 108 may be routed to a cluster 110 on the processing device or to a different processing device 102.

In some implementations, the device controller 106 controls the operation of the processing device 102 from power on through power down. In some implementations, the device controller 106 includes a device controller processor, one or more registers and a device controller memory space. The device controller processor may be any existing or future-developed microcontroller. In some implementations, for example, an ARM® Cortex M0 microcontroller is used for its small footprint and low power consumption. In other implementations, a bigger and more powerful microcontroller is chosen if needed. The one or more registers include one to hold a device identifier (DEVID) for the processing device 102 after the processing device 102 is powered up. The DEVID is used to uniquely identify the processing device 102 in the computing system 100. In some implementations, the DEVID is loaded on system start from a non-volatile storage, for example, a non-volatile internal storage on the processing device 102 or a non-volatile external storage. The device controller memory space may include both read-only memory (ROM) and random access memory (RAM). In some implementations, the ROM may store bootloader code that during a system start is executed to initialize the processing device 102 and load the remainder of the boot code through a bus from outside of the device controller 106. In some implementations, the instructions for the device controller processor, also referred to as the firmware, reside in the RAM after they are loaded during the system start.

Here, the registers and device controller memory space of the device controller 106 are read and written to by computing resources of the computing system 100 using packets. That is, they are addressable using packets. As used herein, the term "memory" may refer to RAM, SRAM, DRAM, eDRAM, SDRAM, volatile memory, non-volatile memory, and/or other types of electronic memory. For example, the header of a packet includes a destination address such as DEVID:PADDR, of which the DEVID may identify the processing device 102 and the PADDR may be an address for a register of the device controller 106 or a memory location of the device controller memory space of a processing device 102. In some implementations, a packet directed to the device controller 106 has a packet operation code, which may be referred to as packet opcode or just opcode, to indicate what operation needs to be performed for the packet. For example, the packet operation code may indicate reading from or writing to the storage location pointed to by PADDR. It should be noted that the device controller 106 also sends packets in addition to receiving them. The packets sent by the device controller 106 may be self-initiated or in response to a received packet (e.g., a read request). Self-initiated packets include, for example, reporting status information, requesting data, etc.

Figure 1B:
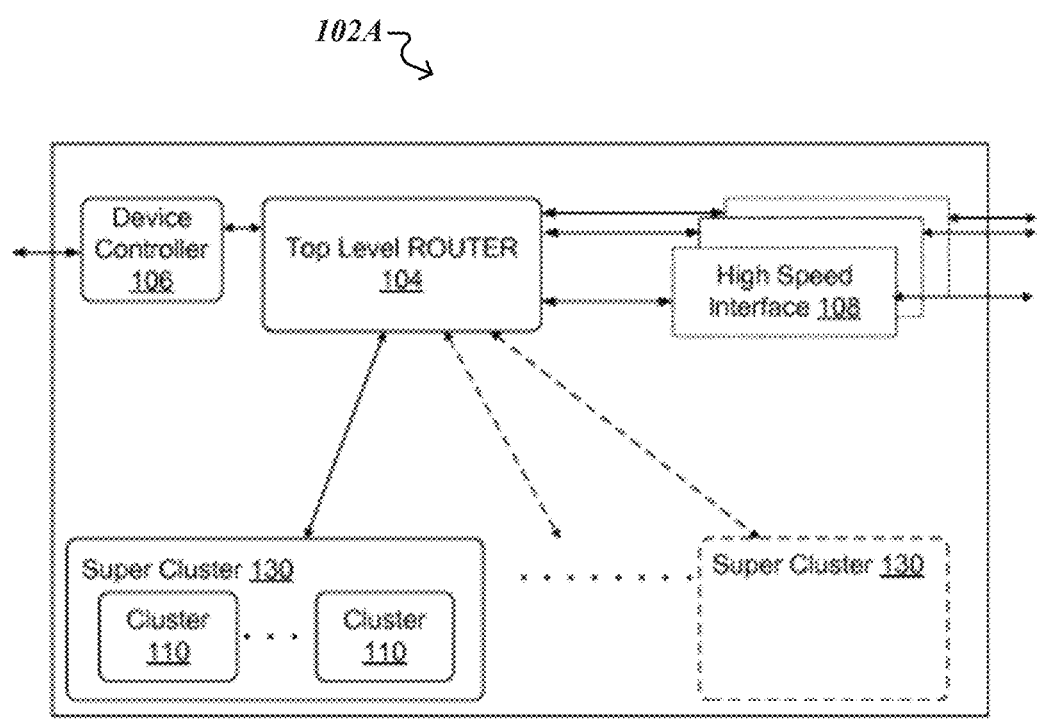
FIG. 1B is a block diagram of an example of a processing device of a computing system.

In some implementations, a plurality of clusters 110 on a processing device 102 are grouped together. FIG. 1B shows a block diagram of another example of a processing device 102A of the computing system 100. The example processing device 102A is one particular embodiment of the processing device 102. Therefore, the processing device 102 referred to in the present disclosure may include any embodiments of the processing device 102, including the example processing device 102A. As shown on FIG. 1B, a plurality of clusters 110 may be grouped together to form a super cluster 130 and the example of processing device 102A may include a plurality of such super clusters 130. In some implementations, a processing device 102 includes 2, 4, 8, 16, 32 or another number of clusters 110, without further grouping the clusters 110 into super clusters. In other implementations, a processing device 102 may include 2, 4, 8, 16, 32 or another number of super clusters 130 and each super cluster 130 may comprise a plurality of clusters.

Figure 2A:
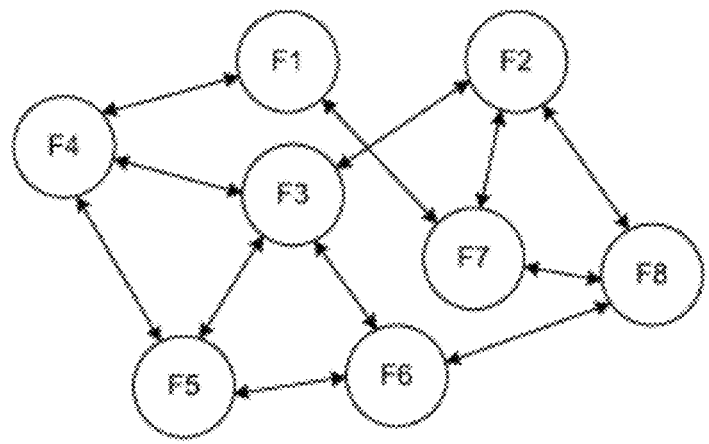
FIG. 2A is a block diagram of topology of connections of an example of a computing system.

FIG. 2A shows a block diagram of an example of a computing system 100A. The computing system 100A may be one example implementation of the computing system 100 of FIG. 1A. The computing system 100A includes a plurality of processing devices 102 designated as F1, F2, F3, F4, F5, F6, F7 and F8. As shown in FIG. 2A, each processing device 102 is directly coupled to one or more other processing devices 102. For example, F4 is directly coupled to F1, F3 and F5; and F7 is directly coupled to F1, F2 and F8. Within computing system 100A, one of the processing devices 102 may function as a host for the whole computing system 100A. In some implementations, the host has a unique device ID that every processing devices 102 in the computing system 100A recognizes as the host. Any of the processing devices 102 may be designated as the host for the computing system 100A. For example, F1 may be designated as the host and the device ID for F1 is set as the unique device ID for the host.

In other implementations, the host is a computing device of a different type, such as a computer processor (for example, an ARM® Cortex or Intel® x86 processor). Here, the host communicates with the rest of the system 100A through a communication interface, which represents itself to the rest of the system 100A as the host by having a device ID for the host.

The computing system 100A may implement any appropriate techniques to set the DEVIDs, including the unique DEVID for the host, to the respective processing devices 102 of the computing system 100A. In some implementations, the DEVIDs are stored in the ROM of the respective device controller 106 for each processing devices 102 and loaded into a register for the device controller 106 at power up. In other implementations, the DEVIDs are loaded from an external storage. Here, the assignments of DEVIDs may be performed offline (when there is no application running in the computing system 100A), and may be changed offline from time to time or as appropriate. Thus, the DEVIDs for one or more processing devices 102 may be different each time the computing system 100A initializes. Moreover, the DEVIDs stored in the registers for each device controller 106 may be changed at runtime. This runtime change is controlled by the host of the computing system 100A. For example, after the initialization of the computing system 100A, which loads the pre-configured DEVIDs from ROM or external storage, the host of the computing system 100A may reconfigure the computing system 100A and assign different DEVIDs to the processing devices 102 in the computing system 100A to overwrite the initial DEVIDs in the registers of the device controllers 106.

Figure 2B:
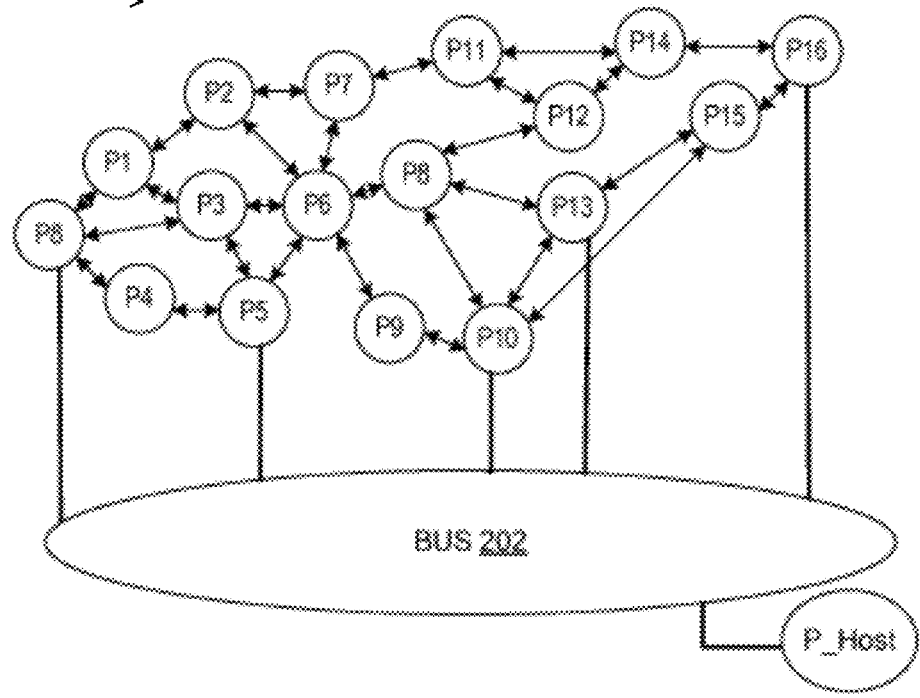
FIG. 2B is a block diagram of topology of connections of another example of a computing system.

FIG. 2B is a block diagram of a topology of another example of a computing system 100B. The computing system 100B is another example implementation of the computing system 100 of FIG. 1 and includes a plurality of processing devices 102 (designated as P1 through P16 on FIG. 2B), a bus 202 and a processing device P_Host. Each processing device of P1 through P16 is directly coupled to another processing device of P1 through P16 by a direct link between them. At least one of the processing devices P1 through P16 is coupled to the bus 202. In the example shown in FIG. 2B, the processing devices P8, P5, P10, P13, P15 and P16 are coupled to the bus 202. Here, the processing device P_Host is coupled to the bus 202 and is designated as the host for the computing system 100B. In the computing system 100B, the host may be a computer processor (for example, an ARM® Cortex or Intel® x86 processor). The host communicates with the rest of the computing system 100B through a communication interface coupled to the bus and represents itself to the rest of the system 100B as the host by having a device ID for the host.

Figure 3A:
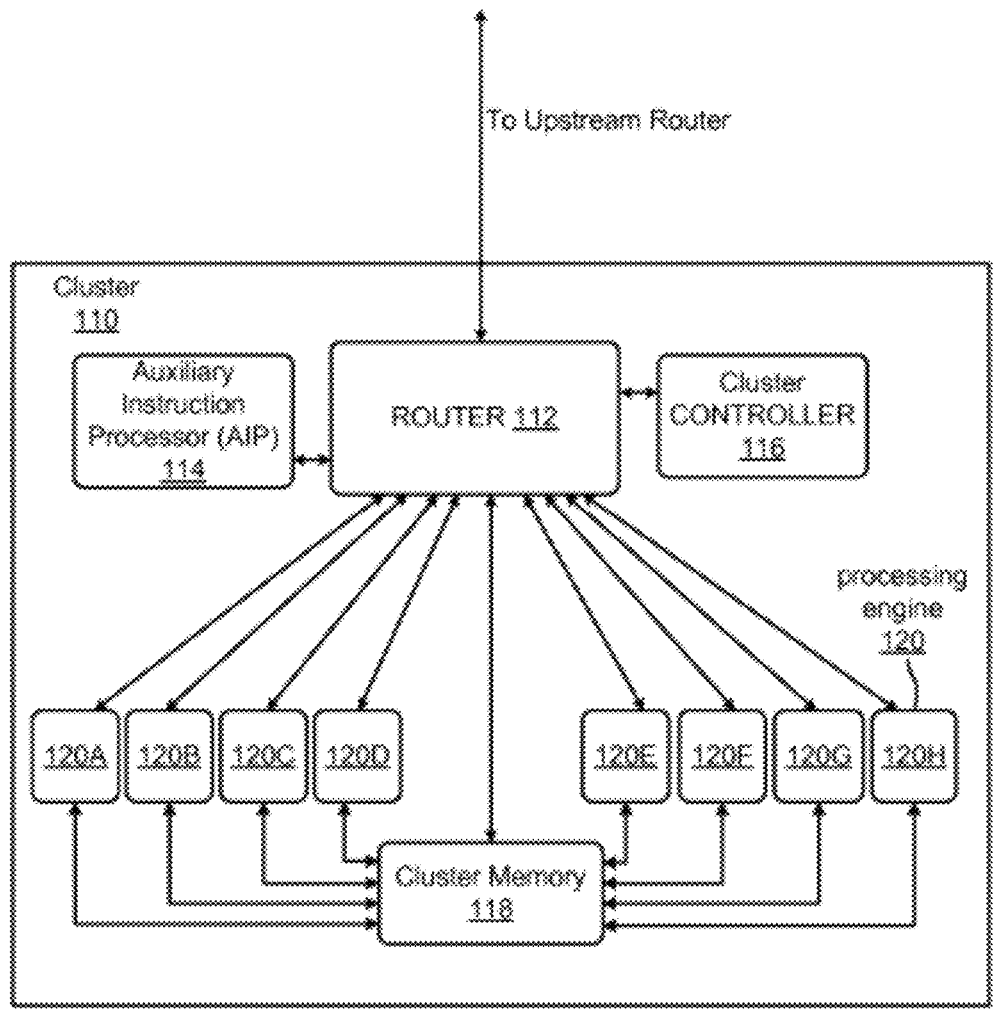
FIG. 3A is a block diagram of an example of a cluster of a computing device.

FIG. 3A shows a block diagram of an example of a cluster 110. The cluster 110 includes a router 112, a cluster controller 116, an auxiliary instruction processor (AIP) 114, a cluster memory 118 and a plurality of processing engines 120. The router 112 is coupled to an upstream router to provide interconnection between the upstream router and the cluster 110. The upstream router may be, for example, the router 104 of the processing device 102 if the cluster 110 is not part of a super cluster 130.

In accordance with network on a chip architecture, examples of operations to be performed by the router 112 include receiving a packet destined for a computing resource within the cluster 110 from outside the cluster 110 and/or transmitting a packet originating within the cluster 110 destined for a computing resource inside or outside the cluster 110. A computing resource within the cluster 110 may be, for example, the cluster memory 118 or any of the processing engines 120 within the cluster 110. A computing resource outside the cluster 110 may be, for example, a computing resource in another cluster 110 of the computer device 102, the device controller 106 of the processing device 102, or a computing resource on another processing device 102. In some implementations, the router 112 also transmits a packet to the router 104 even if the packet may target a resource within itself. In some cases, the router 104 implements a loopback path to send the packet back to the originating cluster 110 if the destination resource is within the cluster 110.

In some implementations, the cluster controller 116 sends packets, for example, as a response to a read request, or as unsolicited data sent by hardware for error or status report. The cluster controller 116 also receives packets, for example, packets with opcodes to read or write data. In some implementations, the cluster controller 116 is a microcontroller, for example, one of the ARM® Cortex-M microcontrollers and includes one or more cluster control registers (CCRs) that provide configuration and control of the cluster 110. In other implementations, instead of using a microcontroller, the cluster controller 116 is custom made to implement any functionalities for handling packets and controlling operation of the router 112. Here, the functionalities may be referred to as custom logic and may be implemented, for example, by FPGA or other specialized circuitry. Regardless of whether it is a microcontroller or implemented by custom logic, the cluster controller 116 may implement a fixed-purpose state machine encapsulating packets and memory access to the CCRs.

In some implementations, each cluster memory 118 is part of the overall addressable memory of the computing system 100. That is, the addressable memory of the computing system 100 includes the cluster memories 118 of all clusters of all devices 102 of the computing system 100. The cluster memory 118 is a part of the main memory shared by the computing system 100. In some implementations, any memory location within the cluster memory 118 may be addressed by any processing engine within the computing system 100 by a physical address. In some implementations, the physical address is a combination of the DEVID, a cluster identifier (CLSID) and a physical address location (PADDR) within the cluster memory 118. As such, the physical address is formed as a string of bits, e.g., DEVID:CLSID:PADDR. The DEVID may be associated with the device controller 106 as described above and the CLSID may be a unique identifier to uniquely identify the cluster 110 within the local processing device 102. It should be noted that in at least some implementations, each register of the cluster controller 116 also be assigned a physical address (PADDR). Therefore, the physical address DEVID:CLSID:PADDR may also be used to address a register of the cluster controller 116, in which PADDR may be an address assigned to the register of the cluster controller 116.

In some other implementations, any memory location within the cluster memory 118 is addressed by any processing engine within the computing system 100 by a virtual address. The virtual address may be a combination of a DEVID, a CLSID and a virtual address location (ADDR). As such, the virtual address is formed as a string of bits, e.g., DEVID:CLSID:ADDR. The DEVID and CLSID in the virtual address may be the same as in the physical addresses.

In some cases, the width of ADDR is specified by system configuration. For example, the width of ADDR is loaded into a storage location convenient to the cluster memory 118 during system start and/or changed from time to time when the computing system 100 performs a system configuration. In some implementations, to convert the virtual address to a physical address, the value of ADDR is added to a base physical address value (BASE). The BASE may also be specified by system configuration as the width of ADDR and stored in a location convenient to a memory controller of the cluster memory 118. In one example, the width of ADDR is stored in a first register and the BASE is stored in a second register in the memory controller. Thus, the virtual address DEVID:CLSID:ADDR is converted to a physical address as DEVID:CLSID:ADDR+BASE. Note that the result of ADDR+BASE has the same width as the target physical address.

The address in the computing system 100 may be 8 bits, 16 bits, 32 bits, 64 bits, or any other number of bits wide. In some implementations, the address is 32 bits wide. The DEVID may be 10, 15, 20, 25 or any other number of bits wide. The width of the DEVID is chosen based on the size of the computing system 100, for example, how many processing devices 102 the computing system 100 has or is designed to have. In some implementations, the DEVID is 20 bits wide and the computing system 100 using this width of DEVID contains up to $2^{20}$ processing devices 102. The width of the CLSID is chosen based on how many clusters 110 the processing device 102 is designed to have. For example, the CLSID may be 3, 4, 5, 6, 7, 8 bits or any other number of bits wide. In some implementations, the CLSID is 5 bits wide and the processing device 102 using this width of CLSID contains up to $2^5$ clusters. The width of the PADDR for the cluster level may be 20, 30 or any other number of bits. For example, the PADDR for the cluster level is 27 bits and the cluster 110 using this width of PADDR contains up to $2^{27}$ memory locations and/or addressable registers. Therefore, in some implementations, if the DEVID is 20 bits wide, CLSID is 5 bits and PADDR has a width of 27 bits, then a physical address DEVID:CLSID:PADDR or DEVID:CLSID:ADDR+BASE is 52 bits.

For performing the virtual to physical memory conversion, the first register (ADDR register) may have 4, 5, 6, 7 bits or any other number of bits. In some implementations, the first register is 5 bits wide. If the value of the 5 bits register is four (4), the width of ADDR is 4 bits; and if the value of 5 bits register is eight (8), the width of ADDR will be 8 bits. Regardless of ADDR being 4 bits or 8 bits wide, if the PADDR for the cluster level is 27 bits, then BASE is 27 bits, and the result of ADDR+BASE still is a 27 bits physical address within the cluster memory 118.

In the example illustrated in FIG. 3A, a cluster 110 includes one cluster memory 118. In other examples, a cluster 110 includes a plurality of cluster memories 118 that each includes a memory controller and a plurality of memory banks, respectively. Moreover, in yet another example, a cluster 110 includes a plurality of cluster memories 118 and these cluster memories 118 are connected together via a router that are downstream of the router 112.

The AIP 114 is a special processing engine shared by all processing engines 120 of one cluster 110. In some implementations, the AIP 114 is implemented as a coprocessor to the processing engines 120. For example, the AIP 114 implements less commonly used instructions such as some floating point arithmetic, including but not limited to, one or more of addition, subtraction, multiplication, division and square root, etc. In the example shown in FIG. 3A, the AIP 114 is coupled to the router 112 directly and is configured to send and receive packets via the router 112. As a coprocessor to the processing engines 120 within the same cluster 110, although not shown in FIG. 3A, the AIP 114 may also be coupled to each processing engines 120 within the same cluster 110 directly. In other implementations, a bus shared by all the processing engines 120 within the same cluster 110 is used for communication between the AIP 114 and all the processing engines 120 within the same cluster 110. In some other implementations, a multiplexer is used to control access to the bus shared by all the processing engines 120 within the same cluster 110 for communication with the AIP 114. In yet other implementations, a multiplexer is used to control communication between the AIP 114 and all the processing engines 120 within the same cluster 110.

Figure 3B:
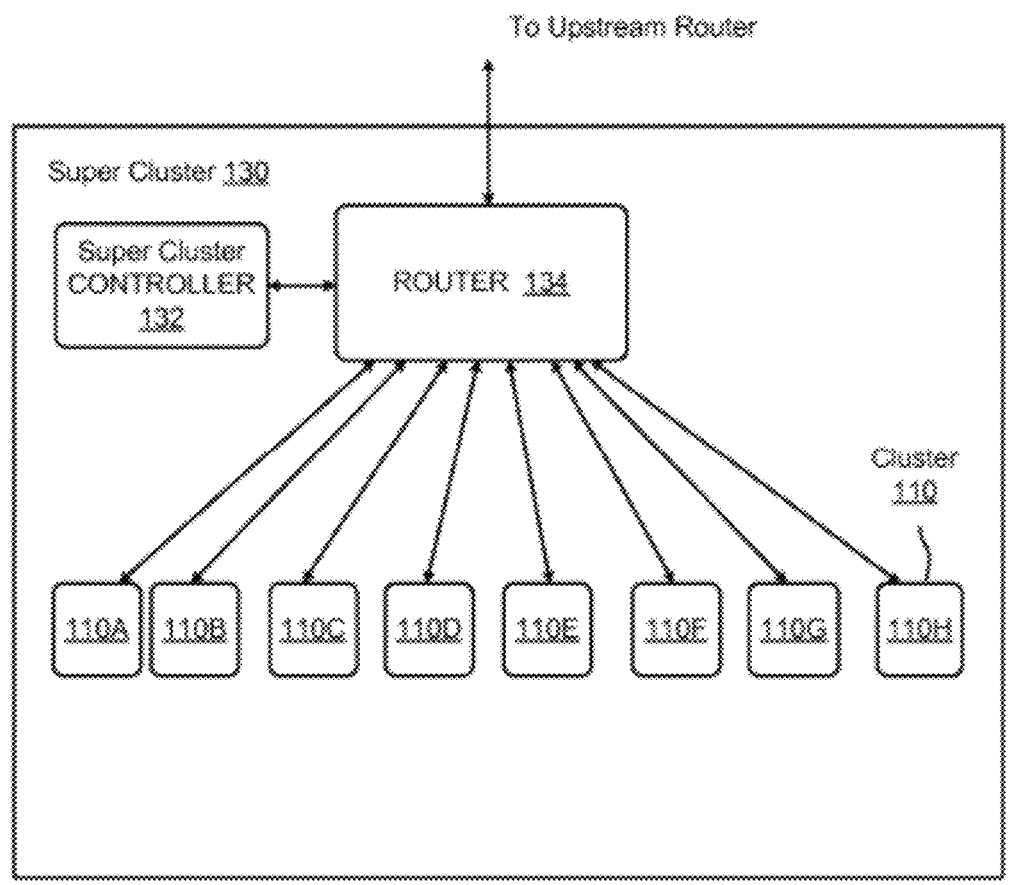
FIG. 3B is a block diagram of an example of a super cluster of a computing device.

The grouping of the processing engines 120 on a computing device 102 may have a hierarchy with multiple levels. For example, multiple clusters 110 are grouped together to form a super cluster. FIG. 3B is a block diagram of an example of a super cluster 130 of the computing device 102. In the example shown in FIG. 3B, a plurality of clusters 110A through 110H are grouped into the super cluster 130. Although 8 clusters are shown in the super cluster 130 on FIG. 3B, the super cluster 130 may include 2, 4, 8, 16, 32 or another number of clusters 110. The super cluster 130 includes a router 134 and a super cluster controller 132, in addition to the plurality of clusters 110. The router 134 is configured to route packets among the clusters 110 and the super cluster controller 132 within the super cluster 130, and to and from computing resources outside the super cluster 130 via a link to an upstream router. In implementations in which the super cluster 130 is used in a processing device 102A, the upstream router for the router 134 is the top level router 104 of the processing device 102A and the router 134 is an upstream router for the router 112 within the cluster 110. In some implementations, the super cluster controller 132 may be configured to implement CCRs, receive and send packets, and implement a fixed-purpose state machine encapsulating packets and memory access to the CCRs. In some cases, the super cluster controller 132 is implemented similar to the way the cluster controller 116 is implemented in a cluster 110. In other implementations, the super cluster 130 is implemented with just the router 134 and does not have a super cluster controller 132.

As noted above, a cluster 110 may include 2, 4, 8, 16, 32 or another number of processing engines 120. FIG. 3A shows an example of a plurality of processing engines 120 that have been grouped into a cluster 110, and FIG. 3B shows an example of a plurality of clusters 110 that have been grouped into a super cluster 130. Grouping of processing engines is not limited to clusters or super clusters. In some implementations, more than two levels of grouping is implemented and each level has its own router and controller.

Figure 4:
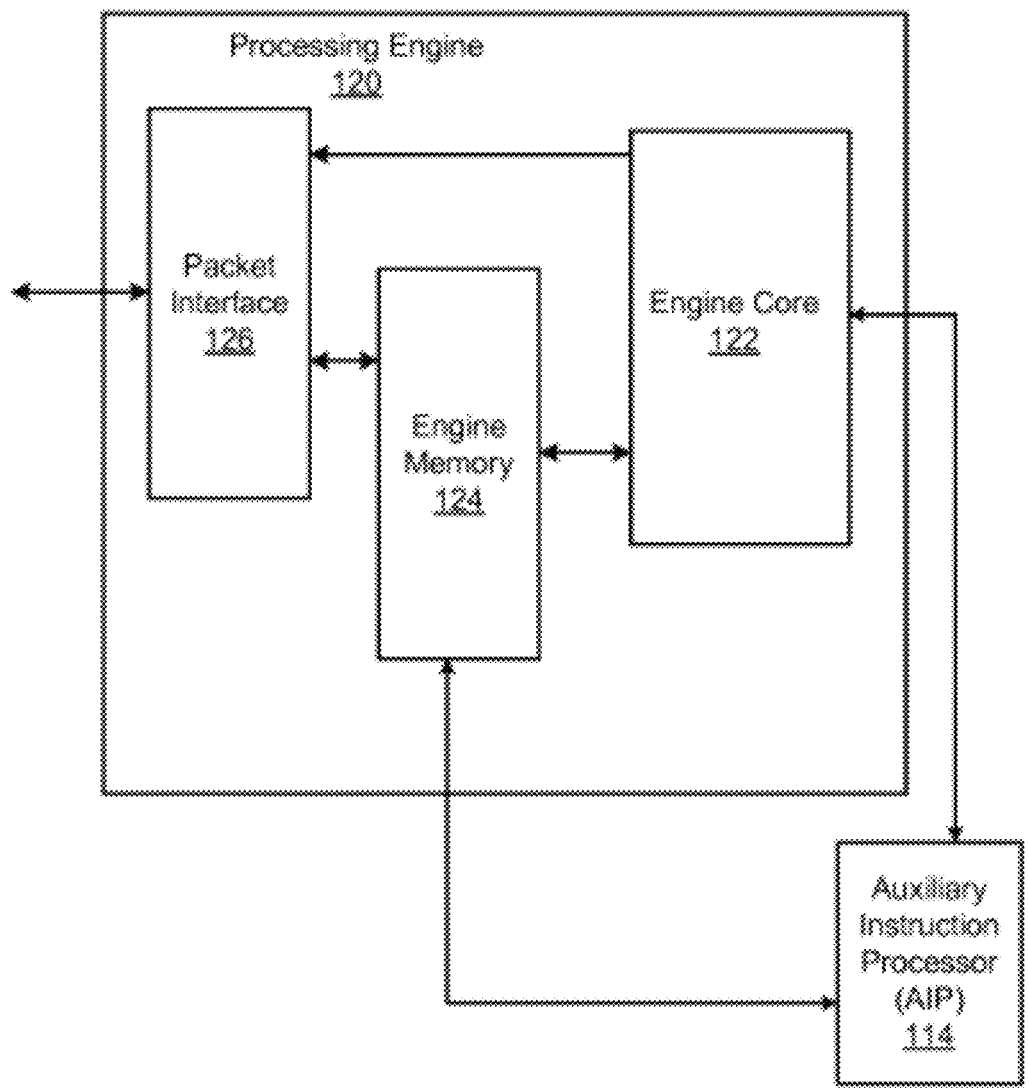
FIG. 4 is a block diagram of an example of a processing engine of a cluster.

FIG. 4 shows a block diagram of an example of a processing engine 120 of a processing device 102. In the example shown in FIG. 4, the processing engine 120 includes an engine core 122, an engine memory 124 and a packet interface 126. Here, the processing engine 120 is directly coupled to an AIP 114. As described above, the AIP 114 may be shared by all processing engines 120 within a cluster 110. In some implementations, the processing core 122 is a central processing unit (CPU) with an instruction set and implements some or all features of modern CPUs, such as, for example, a multi-stage instruction pipeline, one or more arithmetic logic units (ALUs), one or more floating point units (FPUs) or any other CPU technology. The instruction set includes one instruction set for the ALU to perform arithmetic and logic operations, and another instruction set for the FPU to perform floating point operations. In some cases, the FPU is a completely separate execution unit containing a multi-stage, single-precision floating point pipeline. When an FPU instruction reaches the instruction pipeline of the processing engine 120, the instruction and its source operand(s) are dispatched to the FPU.

The instructions of the instruction set may implement the arithmetic and logic operations and the floating point operations, such as those in the INTEL® x86 instruction set, using a syntax similar or different from the x86 instructions. In some implementations, the instruction set includes customized instructions. For example, one or more instructions are implemented according to the features of the computing system 100 and in accordance with network on a chip architecture. In one example, one or more instructions cause the processing engine executing the instructions to generate packets directly with system wide addressing. In another example, one or more instructions have a memory address located anywhere in the computing system 100 as an operand. In the latter example, a memory controller of the processing engine executing the instruction generates packets according to the memory address being accessed.

The engine memory 124 includes a program memory, a register file including one or more general purpose registers, one or more special registers and one or more events registers. In some implementations, the program memory is a physical memory for storing instructions to be executed by the processing core 122 and data to be operated upon by the instructions. In some cases, portions of the program memory are disabled and powered down for energy savings. For example, a top half or a bottom half of the program memory is disabled to save energy when executing a program small enough that half or less of the storage may be needed. The size of the program memory may be 1 thousand (1K), 2K, 3K, 4K, or any other number of storage units. The register file may include 128, 256, 512, 1024, or any other number of storage units. In some implementations, the storage unit is 32-bit wide, which may be referred to as a longword, and the program memory includes 2K 32-bit longwords and the register file includes 256 32-bit registers.

In some implementations, the register file includes one or more general purpose registers and special registers for the processing core 122. The general purpose registers serve functions that are similar or identical to the general purpose registers of an x86 architecture CPU. The special registers are used for configuration, control and/or status, for instance. Examples of special registers include one or more of the following registers: a next program counter, which may be used to point to the program memory address where the next instruction to be executed by the processing core 122 is stored; and a device identifier (DEVID) register storing the DEVID of the processing device 102.

In some implementations, the register file is implemented in two banks—one bank for odd addresses and one bank for even addresses—to permit multiple fast accesses during operand fetching and storing. The even and odd banks are selected based on the least-significant bit of the register address if the computing system 100 is implemented in little endian or on the most-significant bit of the register address if the computing system 100 is implemented in big-endian.

In some implementations, the engine memory 124 is part of the addressable memory space of the computing system 100. That is, any storage location of the program memory, any general purpose register of the register file, any special register of the plurality of special registers and any event register of the plurality of events registers is assigned a memory address PADDR. Each processing engine 120 on a processing device 102 is assigned an engine identifier (ENGINE ID), therefore, to access the engine memory 124, any addressable location of the engine memory 124 may be addressed by DEVID:CLSID:ENGINE ID: PADDR. In some cases, a packet addressed to an engine level memory location includes an address formed as DEVID:CLSID: ENGINE ID: EVENTS:PADDR, in which EVENTS is one or more bits to set event flags in the destination processing engine 120. It should be noted that when the address is formed as such, the events need not form part of the physical address, which is still DEVID:CLSID:ENGINE ID:PADDR. In this form, the events bits may identify one or more event registers to be set but these events bits are separate from the physical address being accessed.

In accordance with network on a chip architecture, the packet interface 126 includes a communication port for communicating packets of data. The communication port is coupled to the router 112 and the cluster memory 118 of the local cluster. For any received packets, the packet interface 126 directly passes them through to the engine memory 124. In some cases, a processing device 102 implements two mechanisms to send a data packet to a processing engine 120. A first mechanism uses a data packet with a read or write packet opcode. This data packet is delivered to the packet interface 126 and handled by the packet interface 126 according to the packet opcode. Here, the packet interface 126 includes a buffer to hold a plurality of storage units, for example, 1K, 2K, 4K, or 8K or any other number. In a second mechanism, the engine memory 124 further includes a register region to provide a write-only, inbound data interface, which may be referred to a mailbox. In some implementations, the mailbox includes two storage units that each can hold one packet at a time. Here, the processing engine 120 has an event flag, which is set when a packet has arrived at the mailbox to alert the processing engine 120 to retrieve and process the arrived packet. While this packet is being processed, another packet may be received in the other storage unit, but any subsequent packets are buffered at the sender, for example, the router 112 or the cluster memory 118, or any intermediate buffers.

In various implementations, data request and delivery between different computing resources of the computing system 100 is implemented by packets. FIG. 5 illustrates a block diagram of an example of a packet 140 in accordance with network on a chip architecture. As shown in FIG. 5, the packet 140 includes a header 142 and an optional payload 144. The header 142 includes a single address field, a packet opcode (POP) field and a size field. The single address field indicates the address of the destination computing resource of the packet, which may be, for example, an address at a device controller level such as DEVID:PADDR, an address at a cluster level such as a physical address DEVID:CLSID:PADDR or a virtual address DEVID:CLSID:ADDR, or an address at a processing engine level such as DEVID:CLSID:ENGINE ID:PADDR or DEVID:CLSID:ENGINE ID:EVENTS:PADDR. The POP field may include a code to indicate an operation to be performed by the destination computing resource. Exemplary operations in the POP field may include read (to read data from the destination) and write (to write data (e.g., in the payload 144) to the destination).

In some implementations, examples of operations in the POP field further include bulk data transfer. For example, certain computing resources implement a direct memory access (DMA) feature. Examples of computing resources that implement DMA may include a cluster memory controller of each cluster memory 118, a memory controller of each engine memory 124, and a memory controller of each device controller 106. Any computing resource that implements the DMA may perform bulk data transfer to another computing resource using packets with a packet opcode for bulk data transfer.

In addition to bulk data transfer, the examples of operations in the POP field further include transmission of unsolicited data. For example, any computing resource may generate a status report or incur an error during operation, the status or error is reported to a destination using a packet with a packet opcode indicating that the payload 144 contains the source computing resource and the status or error data.

The POP field may be 2, 3, 4, 5 or any other number of bits wide. In some implementations, the width of the POP field is selected depending on the number of operations defined for packets in the computing system 100. Also, in some embodiments, a packet opcode value can have different meaning based on the type of the destination computing resource that receives it. For example, for a three-bit POP field, a value 001 may be defined as a read operation for a processing engine 120 but a write operation for a cluster memory 118.

In some implementations, the header 142 further includes an addressing mode field and an addressing level field. Here, the addressing mode field contains a value to indicate whether the single address field contains a physical address or a virtual address that may need to be converted to a physical address at a destination. Further here, the addressing level field contains a value to indicate whether the destination is at a device, cluster memory or processing engine level.

The payload 144 of the packet 140 is optional. If a particular packet 140 does not include a payload 144, the size field of the header 142 has a value of zero. In some implementations, the payload 144 of the packet 140 contains a return address. For example, if a packet is a read request, the return address for any data to be read may be contained in the payload 144.

Figure 6:
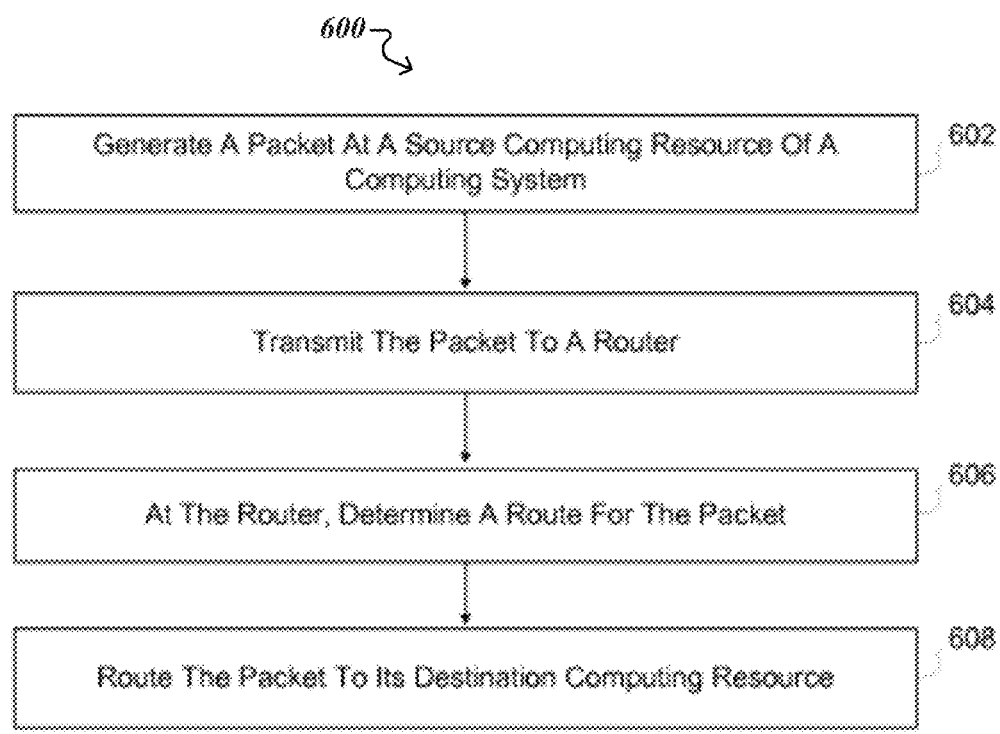
FIG. 6 is a flow diagram showing an example of a process of addressing a computing resource of a computing system using a packet.

FIG. 6 is a flow diagram showing an example of a process 600 of addressing a computing resource of a computing system using a packet in accordance with network on a chip architecture. An implementation of the computing system 100 may have one or more processing devices 102 configured to execute some or all of the operations of the process 600 in response to instructions stored electronically on an electronic storage medium. The one or more processing devices 102 include one or more devices configured through hardware, firmware, and/or software to execute one or more of the operations of the process 600.

The process 600 may start with block 602, at which a packet is generated at a source computing resource of the computing system 100. The source computing resource may be, for example, a device controller 106, a cluster controller 118, a super cluster controller 132 if a super cluster is implemented, an AIP 114, a memory controller for a cluster memory 118, or a processing engine 120. The generated packet may be the packet 140 described above in connection with FIG. 5. From block 602, the exemplary process 600 may continue to the block 604, where the packet is transmitted to an appropriate router based on the source computing resource that generated the packet. For example, if the source computing resource is a device controller 106, the generated packet is transmitted to a top level router 104 of the local processing device 102; if the source computing resource is a cluster controller 116, the generated packet is transmitted to a router 112 of the local cluster 110; if the source computing resource is a memory controller of the cluster memory 118, the generated packet is transmitted to a router 112 of the local cluster 110, or a router downstream of the router 112 if there are multiple cluster memories 118 coupled together by the router downstream of the router 112; and if the source computing resource is a processing engine 120, the generated packet is transmitted to a router of the local cluster 110 if the destination is outside the local cluster and to a memory controller of the cluster memory 118 of the local cluster 110 if the destination is within the local cluster.

At block 606, a route for the generated packet is determined at the router. As described above, the generated packet includes a header that includes a single destination address. The single destination address is any addressable location of a uniform memory space of the computing system 100. The uniform memory space is an addressable space that covers all memories and registers for each device controller, cluster controller, super cluster controller if a super cluster is implemented, cluster memory and processing engine of the computing system 100. In some cases, the addressable location is part of a destination computing resource of the computing system 100. The destination computing resource may be, for example, another device controller 106, another cluster controller 118, a memory controller for another cluster memory 118, or another processing engine 120, which is different from the source computing resource. The router that received the generated packet determines the route for the generated packet based on the single destination address. At block 608, the generated packet is routed to its destination computing resource.

Figure 7A:
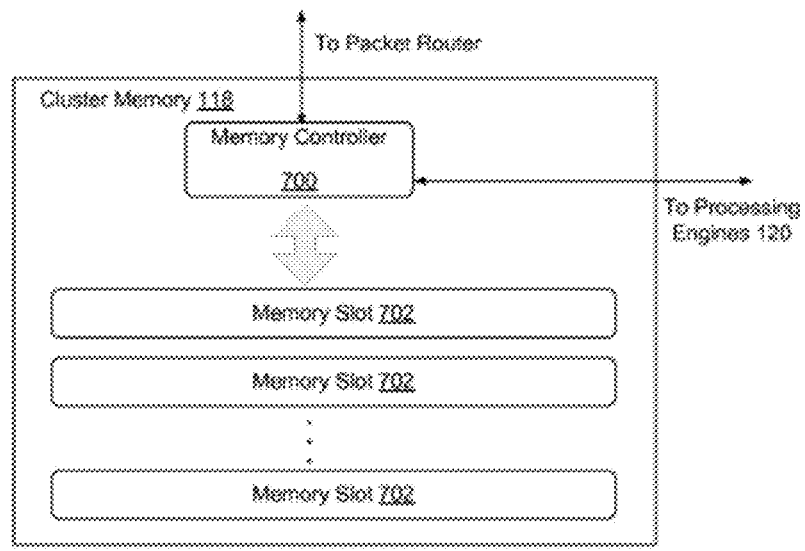
FIG. 7A is a block diagram of an example of a cluster memory.

FIG. 7A is a block diagram of an example of cluster memory 118 of a cluster of a computing device. The cluster memory 118 includes a memory controller 700 and a plurality of memory slots 702. The memory controller 700 may also be referred to as a cluster memory controller to distinguish it from other memory controllers in a processing device 102; for example, a memory controller for a processing engine 120, or a memory controller for a device controller 106.

In the example shown in FIG. 7A, the memory controller 700 is coupled to a packet router and to processing engines 120 via different data links. In implementations which have one cluster memory 118 within a cluster 110, the memory controller 700 is coupled to the router 112 of the cluster 110. The memory controller 700 may also be referred to as a smart memory controller because it implements two different access protocols: by packet access and direct memory access.

In some implementations, the data link between the memory controller 700 and a router is a packet-based data communication. The packet-based data communication uses packets as described above, e.g., such as the packet 140 shown in FIG. 5. In some implementations, the data link between the memory controller 700 and processing engines 120 is a direct data communication. Here, the processing engines 120 coupled to the memory controller 700 are the plurality of processing engines 120 within the same cluster 110 and the direct data communication includes memory access techniques. Examples of existing memory access technologies that may be used for the direct data communication between the memory controller 700 and the plurality of processing engines 120 within the cluster 110 include bus, crossbar, or any other existing memory access techniques for a network on a chip architecture.

The memory slots 702 are slots configured to receive memory banks and are configured for memories such as synchronous dynamic random-access memory (SDRAM), double data rate (DDR) SDRAM, DDR2 SDRAM, DDR3 SDRAM, or 3D RAM.

Figure 7B:
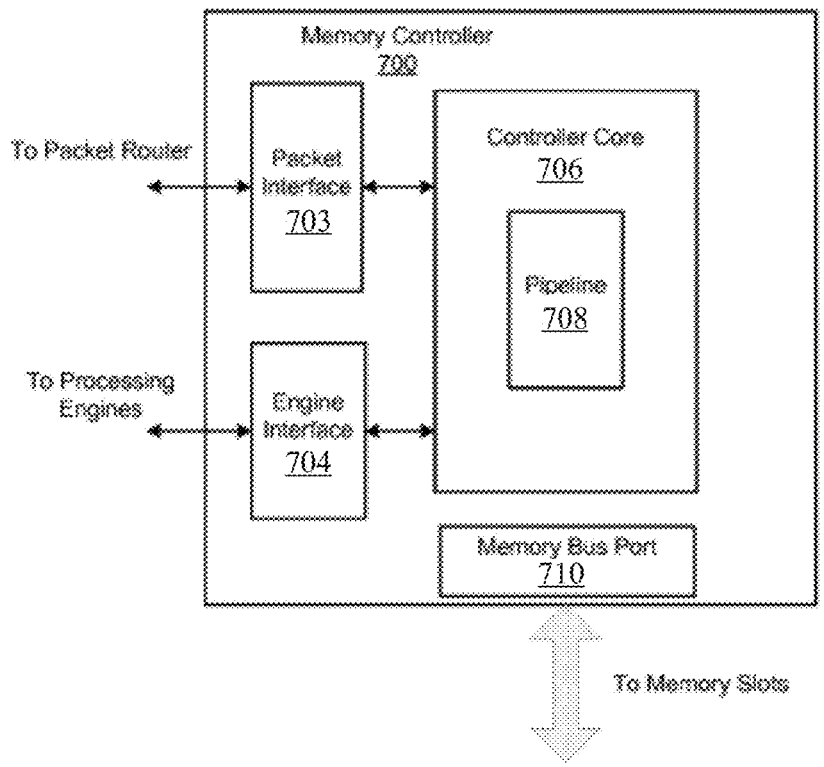
FIG. 7B is a block diagram of an example of a memory controller of a cluster memory.

FIG. 7B is a block diagram of an example memory controller 700 for a cluster memory 118. Here, the memory controller 700 includes a packet interface 703, an engine interface 704, a controller core 706 and a memory bus port 710. The engine interface 704 is configured to support direct memory access by the processing engines 120 within the cluster 110. As such, the engine interface 704 implement part or all features of access technologies, such as but not limited to include bus, crossbar, or any other memory access techniques for a network on a chip architecture. The packet interface 703 includes hardware components configured to receive and transmit packets to a router. In some implementations, the packet interface 703 include a queue to buffer received packets and another queue to buffer packets to be sent. Once a packet is received at the packet interface 703, it is forwarded to the controller core 706 for processing. The memory bus port 710 is a data connection port configured to couple the memory controller 700 to the memory slots 702.

The controller core 706 is configured to decode a received packet, perform a memory operation (if required by the packet opcode), and generate a result packet (if necessary). For example, if a received packet has a packet opcode for a memory write, the controller core 706 extracts data from the received packet and writes the data to the memory bank at an address specified in the packet. Likewise, if a received packet has a packet opcode for a memory read, the controller core 706 reads data from the memory address specified in the packet, places the data in a new packet with a destination address specified in the read packet, and sends the new packet to the packet interface 703 to be queued for transmission. In some implementations, the controller core 706 has a structure similar to a typical CPU. For example, the controller core 706 includes an optional pipeline 708 to perform the steps of decoding the packet, performing the memory operation, and generating a result packet.

In some implementations, packet ordering issues can be addressed by sending a packet containing a data to be written to a destination computing resource, then sending another packet to the destination computing resource to read exactly that same data. Arrival of a read response packet back at an originator computing resource signals that the data has been made available at the destination computing resource. The originator computing resource can then send a packet (e.g., to another computing resource) to signal that the data has been made available at the destination computing resource, and is ready for processing. This can be implemented as described below.

Figure 8A:
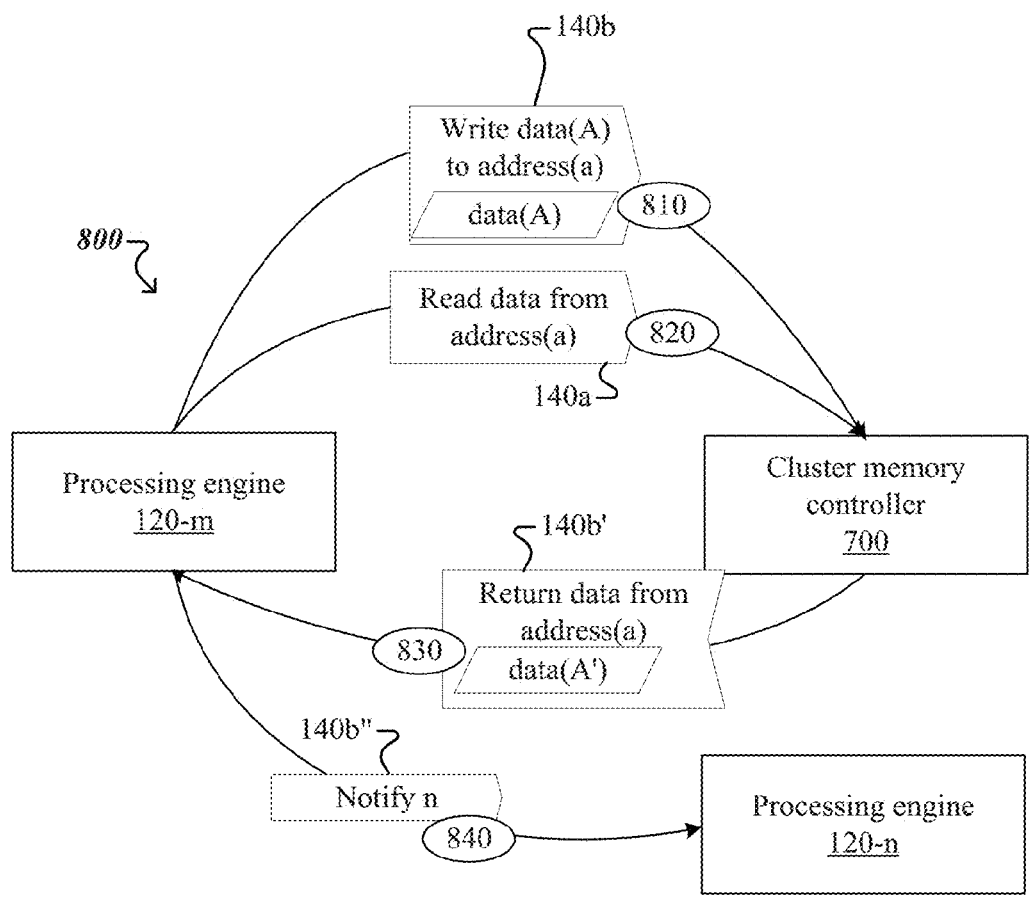
FIG. 8A shows aspects of an example of a conventional process used by an originator computing resource to write data to memory associated with a destination computing resource, then to verify whether the data has been written, and if so, to notify a notification target computing resource that the data has been written, where one or more of each of write packets, read packets and response packets are used to perform the conventional process.
Figure 8B:
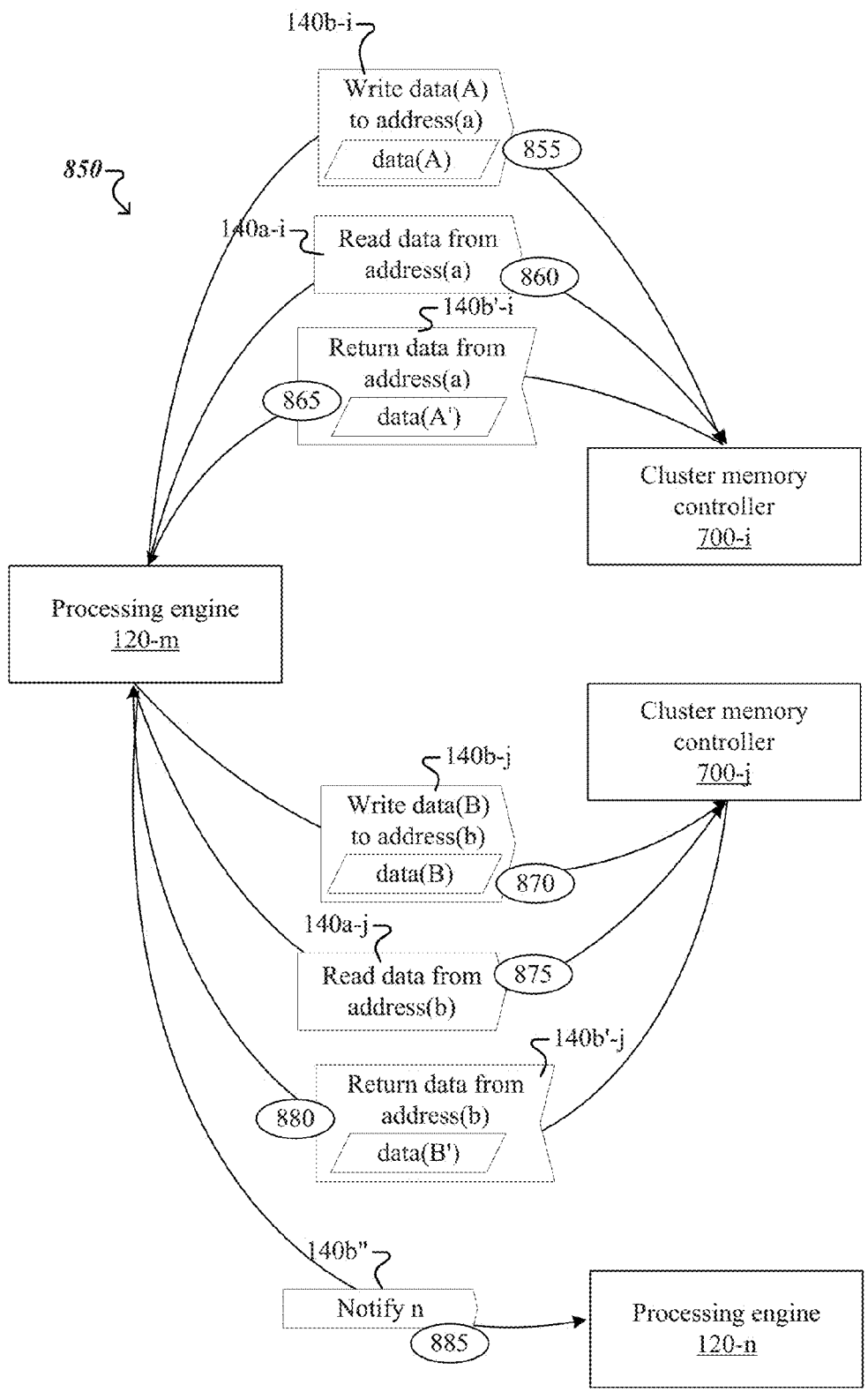
FIG. 8B shows aspects of an example of a conventional process used by an originator computing resource to write data to memories respectively associated with destination computing resources, then to verify whether the data has been respectively written, and if so, to notify a notification target computing resource that the data has been respectively written, where one or more of each of write packets, read packets and response packets are used to perform the conventional process.

FIGS. 8A and 8B show aspects of respective examples of conventional processes 800 and 850 used by an originator computing resource to write data to one or more memories respectively associated with destination computing resources, then to verify whether the data has been written, and if so, to notify a notification target computing resource that the data has been written. One or more of each of write packets, read packets and response packets are used to perform the conventional processes 800 and 850. In some implementations, the originator computing resource, the one or more destination computing resources and the notification target computing resource are part of a computing system like the computing system 100 described above in connection with FIG. 1A, the computing system 100A described above in connection with FIG. 2A, or the computing system 100B described above in connection with FIG. 2B. Here, the computing resources involved in the conventional processes 800 and 850 can be any of a device controller 106, cluster controller 116, AIP 114, super cluster controller 132, processing engine 120, memory controller 700 of cluster memory 118, or other computing resources of the computing system 100, 100A or 100B.

In the examples illustrated in FIGS. 8A and 8B, the originator computing resource is a processing engine 120-*m*, the one or more destination computing resources are cluster memory controllers 700, 700-*i*, 700-*j* and the notification target computing resource is another processing engine 120-*n*. Here, cluster memories (e.g., 118) controlled by the cluster memory controller 700, 700-*i*, 700-*j* may be part of the same cluster (e.g., 110) to which one or both of the processing engines 120-*m* and 120-*n* belong, or may be part of a different cluster of the same processing device (e.g., 102) or of a different processing device. Moreover, the processing engines 120-*m* and 120-*n* may be part of the same cluster, or may be part of different clusters of the same processing device or of a different processing device.

Referring now to FIG. 8A, the conventional process 800 of writing data A (denoted data(A)), stored in a memory associated with the processing engine 120-*m*, to cluster memory (e.g., 118) controlled by the cluster memory controller 700, then to verify whether data(A) has been written, and if so, to notify the other processing engine 120-*n* that data(A) has been written is described first. The processing engine 120-*m* accesses data(A) in the memory associated with the processing engine. Additionally, at 810, the processing engine 120-*m* transmits a write packet 140*b* to instruct the cluster memory controller 700 to write data(A) to a memory location of the cluster memory, e.g., to memory address "a", denoted address(a). In response to receiving this instruction, the cluster memory controller 700 performs an operation of writing data(A) to address(a) of the cluster memory. In some implementations, the operation of writing data(A) to address(a) of the cluster memory can include one or more of queueing data(A) in a write queue managed by the cluster memory controller 700, preparing data(A) for writing, e.g., by segmenting it, encoding it, and the like, based on a recording protocol, for instance, followed by actually recording data(A) at address(a) in the cluster memory.

Prior to notifying the other processing engine **120-*n* that data(A) has been written to the cluster memory, the processing engine 120-*m* transmits, at 820, at least one read packet 140*a* to instruct the cluster memory controller 700 to read data from the same memory location of the cluster memory specified in the write packet 140*b*, e.g., from address(a). In response to receiving this instruction, the cluster memory controller 700 accesses data (e.g., data(A')) stored at address(a) in the cluster memory and, at 830, transmits data(A') in a response packet 140*b*' to the processing engine 120-*i*. Once the processing engine 120-*m* verifies that data(A') received from the cluster memory controller 700 matches data(A) stored in the memory associated with the processing engine 120-*m*, then the processing engine 120-*m* transmits, at 840, another response packet 140*b*" to notify the other processing engine 120-*n* that data(A) has been written to the cluster memory. Upon receipt of the other response packet 140*b*", the other processing engine 120-*n* can read, modify or, in general, process data(A) written in the cluster memory, as specified by code operating the other processing engine 120-*n***.

Referring now to FIG. 8B, the conventional process 850 of writing data A (denoted data(A)) and data B (denoted data(B)), stored in a memory associated with the processing engine **120-*m*, to cluster memories (e.g., 118) respectively controlled by the cluster memory controller 700-*i* and the other cluster memory controller 700-*j*, then to verify whether data(A) and data(B) have been written, and if so, to notify the other processing engine 120-*n* that data(A) and data(B) has been written is described next. The processing engine 120-*i* accesses data(A) in the memory associated with the processing engine 120-*m*. At 855, the processing engine 120-*m* transmits a write packet 140*b*-*i* to instruct the cluster memory controller 700-*i* to write data(A) to a memory location of the cluster memory, e.g., to memory address "a", denoted address(a). Concurrently or subsequently, the processing engine 120-*i* accesses data(B) in the memory associated with the processing engine 120-*m*. At 870, the processing engine 120-*m* transmits another write packet 140*b*-*j* to instruct the other cluster memory controller 700-*j* to write data(B) to another memory location of the other cluster memory, e.g., to memory address "b", denoted address(b). In response to receiving the write packet 140*b*-*i*, the cluster memory controller 700-*i* performs an operation of writing data(A) to address(a) of the cluster memory, and in response to receiving the other write packet 140*b*-*j*, the other cluster memory controller 700-*j* performs an operation of writing data(B) to address(b) of the other cluster memory. Here, the operations of writing data(A) or data(B) to address (a) or address(b) of the respective cluster memories can be performed as described above connection with FIG. 8A**.

Prior to notifying the other processing engine **120-*n* that data(A) has been written to the cluster memory and data(B) has been written to the other cluster memory, the processing engine 120-*m* transmits, at 860, at least one read packet 140*a*-*i* to instruct the cluster memory controller 700-*i* to read data from the same memory location of the cluster memory specified in the write packet 140*b*-*i*, e.g., from address(a), and at 875, at least one other read packet 140*a*-*j* to instruct the other cluster memory controller 700-*j* to read data from the same memory location of the other cluster memory specified in the other write packet 140*b*-*j*, e.g., from address (b). In response to receiving the read packet 140*a*-*i*, the cluster memory controller 700-*i* accesses data(A') stored at address(a) in the cluster memory and, at 865, transmits data(A') in a response packet 140*b*'-*i* to the processing engine 120-*i*. Moreover, in response to receiving the other read packet 140*a*-*j*, the other cluster memory controller 700-*j* accesses data(B') stored at address(b) in the other cluster memory and, at 880, transmits data(B') in another response packet 140*b*'-*j* to the processing engine 120-*i*. Once the processing engine 120-*m* verifies that data(A') and data(B') received from the cluster memory controller 700-*i* and the other cluster memory controller 700-*j* respectively matches data(A) and data(B) stored in the memory associated with the processing engine 120-*m*, then the processing engine 120-*m* transmits, at 885, another response packet 140*b*" to notify the other processing engine 120-*n* that data(A) has been written to the cluster memory and data(B) has been written to the other cluster memory. Upon receipt of the other response packet 140*b*", the other processing engine 120-*n* can read, modify or, in general, process data(A) written in the cluster memory and data(B) written in the other cluster memory, as specified by code operating the other processing engine 120-*n***.

Figure 8C:
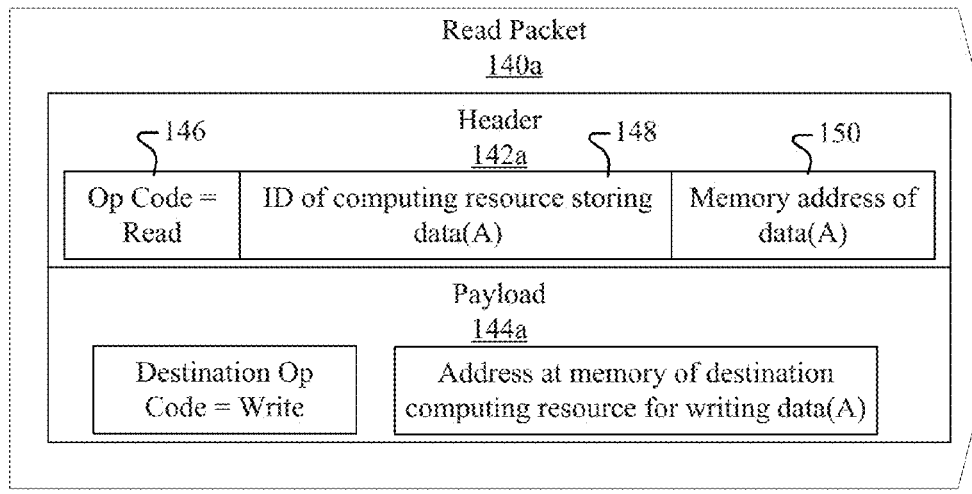
FIG. 8C is a block diagram of an example of a read packet used to instruct a computing resource of a computing system to perform a read operation.

FIG. 8C shows an example of a read packet **140*a* that can be used in either of the conventional processes 800 or 850 to instruct a readout computing resource (e.g., cluster memory controller 700, 700-*i* or 700-*j*) of a computing system (e.g., 100) to read data(A) (or data(B)). In this example, the read packet 140*a* has a header 142*a* and a payload 144*a*. The header 142*a* includes at least an opcode 146, an ID 148 of the readout computing resource to which the read packet 140*a* is addressed, and an address 150 of data(A) (or data(B)) at memory associated with the readout computing resource. Here, the opcode 146 has a value corresponding to a "read" operation and specifies an instruction for the readout computing resource to read data(A) from the memory address 148. The ID 148 and the memory address 150 can be provided in any of the forms described above in connection with FIG. 5. In the example illustrated in FIG. 8C, the payload 144*a* includes information relating to a destination computing resource where data(A) (or data(B)) is to be forwarded to after it has been read by the readout computing device from the memory address 148. Here, the payload 144*a*** includes at least an opcode that specifies an instruction for the destination computing resource to write data(A) (or data(B)) and a memory address at which the destination computing resources should write data(A) (or data(B)).

Figure 8D:
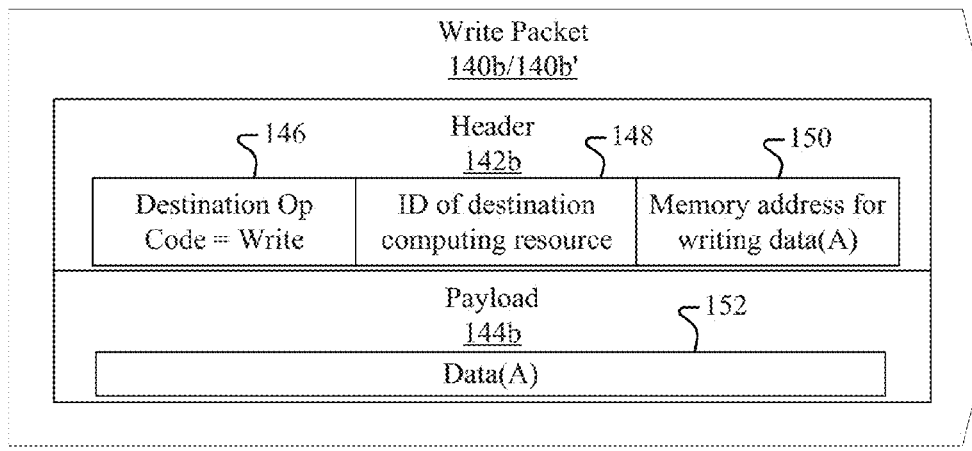
FIG. 8D is a block diagram of an example of a write packet used to instruct a computing resource of a computing system to perform a write operation.

FIG. 8D shows an example of a write packet **140*b* that can be used in either of the conventional processes 800 or 850 to instruct a destination computing resource (e.g., cluster memory controller 700, 700-*i* or 700-*j*) of a computing system (e.g., 100) to write data(A) (or data(B)) provided in the write packet. Note that an instance of the write packet can also be used in either of the conventional processes 800 or 850 as a read response packet 140*b*' in which a readout computing resource (e.g., cluster memory controller 700, 700-*i* or 700-*j*) provides data(A) (or data(B)) to a destination computing resource (e.g., the processing engine 120-*m*). In either case, the write packet 140*b* or the read response packet 140*b*' has a header 142*b* and a payload 144*b*. The payload 144*b* includes data(A) (or data(B)). The header 142*b* includes at least an opcode 146, an ID 148 of the destination computing resource to which the write packet 140*b* or the read response packet 140*b*' is addressed and an address 150 at memory associated with the destination computing resource. Here, the opcode 146 has a value corresponding to a "write" operation and specifies an instruction for the destination computing resource to write data(A) (or data(B)) at the address 148. The ID 148 and the memory address 150 can be provided in any of the forms described above in connection with FIG. 5**.

Figure 8E:
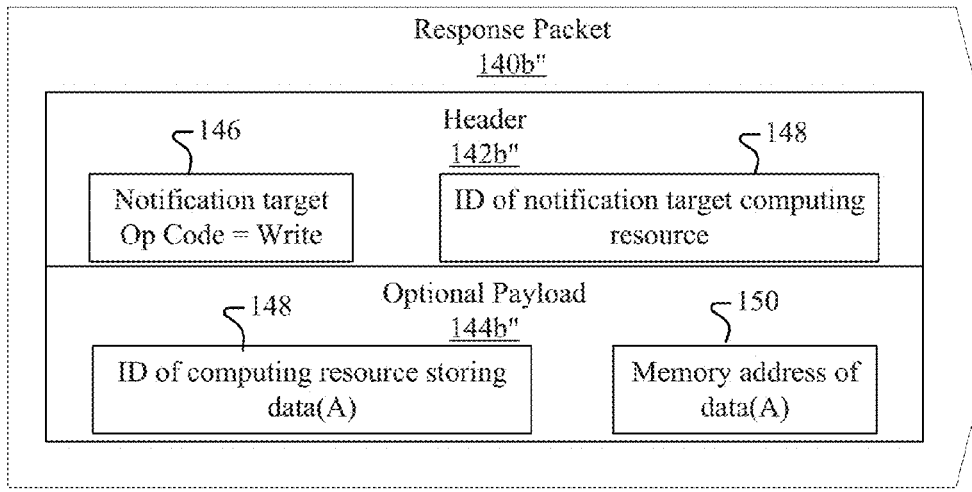
FIG. 8E is a block diagram of an example of a response packet used to notify a computing resource of a computing system that a write operation has been performed by another computing resource of the computing system.

FIG. 8E shows an example of a response packet 140b" that can be used in either of the conventional processes 800 or 850 to notify a notification target computing resource (e.g., the other processing engine 120-n) of a computing system (e.g., 100) that data(A) (and/or data(B)) has(/have) been written to a destination computing resource (e.g., cluster memory controlled by cluster memory controller 700, 700-i or 700-j) of the computing system. In this example, the response packet 140b" has a header 142b" and an optional payload 144b". When present, the payload 142b" can include, for instance, information relating to a computing resource storing data(A) (or data(B)), such as, e.g., an ID 148 of the storing computing resource and an address 150 of data(A) (or data(B)) at memory associated with the storing computing resource. The ID 148 and the memory address 150 can be provided in any of the forms described above in connection with FIG. 5. The header 142b" includes at least an opcode 146 and an ID 148 of the notification target computing resource to which the response packet 140b" is addressed. Here, the opcode 146 has a value corresponding to a "write" operation and specifies an instruction for the notification target computing resource to write the information relating to the computing resource storing data(A) (or data(B)).

Referring again to FIGS. 8A and 8B, although each of the conventional processes 800 and 850 can be effectively used for their own respective purpose, their respective efficiencies are not optimized for the following reasons: Each of the conventional processes 800 and 850 carries data(A) (or data(B)) back to the originator computing resource, even though all that is needed is confirmation that data(A) (or data(B)) has been written at the destination computing resource to ensure that subsequent operations to be performed on the written data(A) (or written data(B)) will be processed in order. As described above, three write packets for each write operation followed by a response packet are being transmitted for the conventional processes 800 or 850, although only a write packet and a response packet appear to be needed. Latency is added to a write operation carried out using a write packet 120b as in the conventional processes 800 and 850, because such a write operation is followed by a read operation carried out using a combination of a read packet 120a and a read response packet 120b', and this read operation can only succeed after the original write packet has been processed at its destination.

Hence, there is a need for an operation that advantageously allows an originator computation resource to send a packet including data to be written to a destination computing resource and a response packet, the latter to be sent by the destination computing resource (after the data has been committed for writing at the destination computing resource) to a notification target computing resource to signal that the data has been written. Such a write-with response (WWR) operation is described below.

Figure 9:
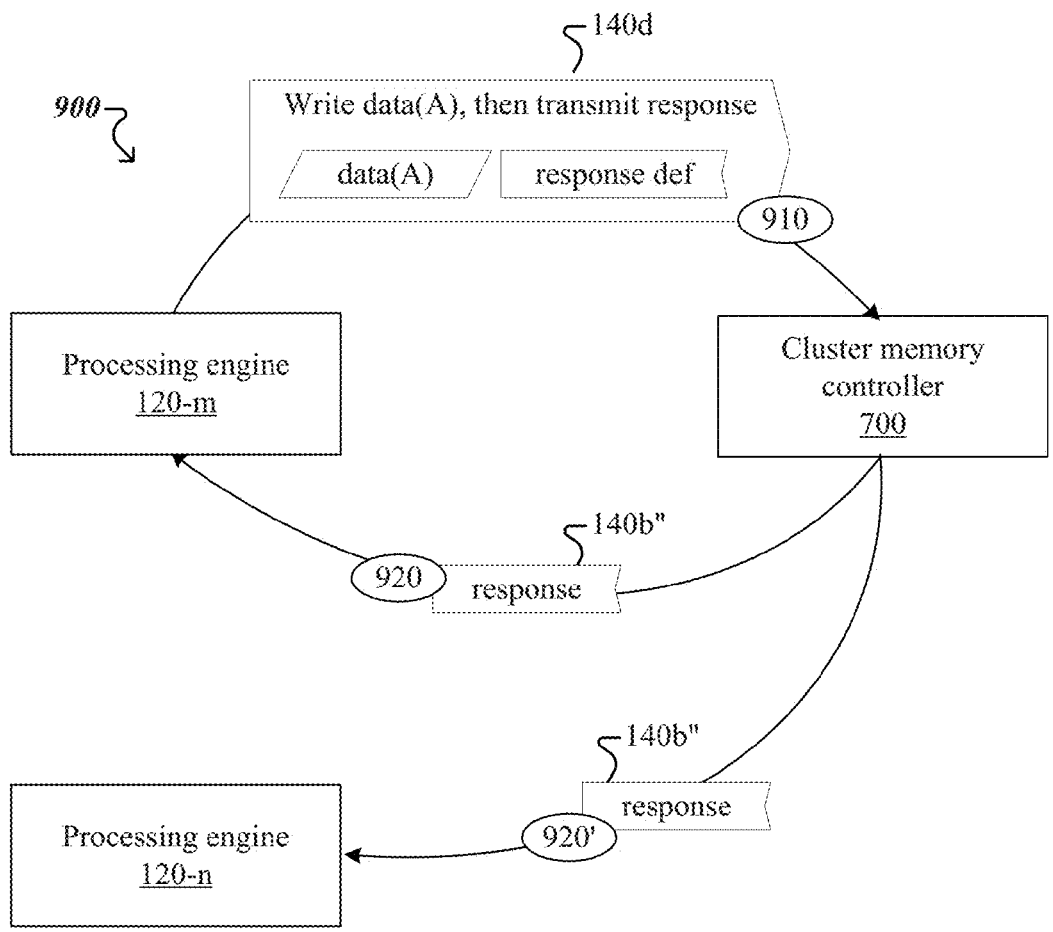
FIG. 9 shows aspects of an example of a process used, first, by an originator computing device to write data to memory associated with a destination computing resource, using a write-with-response (WWR) packet that includes a response packet, then, second, by the destination computing resource to notify a notification target computing resource that the data has been written, using the response packet included in the WWR packet.

FIG. 9 shows aspects of an example of a process 900 used, first, by an originator computing resource to write data to memory associated with a destination computing resource, using a write-with-response (WWR) packet 140d that includes data specifying a response packet definition, then, second, by the destination computing resource to notify a notification target computing resource that the data has been written, using a response packet generated based on the response packet definition included in the WWR packet. In some implementations of the process 900, the originator computing resource, the destination computing resource and the notification target computing resource are part of a computing system like the computing system 100 described above in connection with FIG. 1A, the computing system 100A described above in connection with FIG. 2A, or the computing system 100B described above in connection with FIG. 2B. Here, the computing resources involved in the process 900 can be one or more of a device controller 106, cluster controller 116, AIP 114, super cluster controller 132, processing engine 120, memory controller 700 of cluster memory 118, or other computing resources of the computing system 100, 100A or 100B.

In the example illustrated in FIG. 9, the originator computing resource is a processing engine 120-m, the destination computing resource is a cluster memory controller 700 and a notification target computing resource can be either the processing engine 120-m or another processing engine 120-n. Here, a cluster memory (e.g., 118) controlled by the cluster memory controller 700 may be part of the same cluster (e.g., 110) to which one or both of the processing engines 120-m and 120-n belong, or may be part of a different cluster of the same processing device (e.g., 102) or of a different processing device. Moreover, the processing engines 120-m and 120-n may be part of the same cluster, or may be part of different clusters of the same processing device or of a different processing device.

Here, the processing engine 120-m accesses data(A) in the memory associated with the processing engine. Additionally, at 910, the processing engine 120-m transmits a WWR packet 140d, that includes data(A) and data specifying a response packet definition, to the cluster memory controller 700. The WWR packet 140d also includes data specifying instructions for the cluster memory controller 700 to write data(A) to the cluster memory, and then, to notify, using the response packet definition, a notification target computing resource once data(A) has been written to the cluster memory. As the sequence of operations of receiving the WWR packet 140d with data(A) and the response packet definition, writing data(A), generating a response packet 140b" based on the response packet definition, and forwarding the response packet 140b" is defined as a "write-with-response" (WWR) operation, the instructions specified in the WWR packet 140d can be encoded in an opcode with a value corresponding to a WWR operation. In response to receiving the WWR packet 140d, the cluster memory controller 700 performs an operation of writing data(A) to the cluster memory. As noted above in this specification, the operation of writing data(A) to the cluster memory can include one or more of queueing data(A) in a write queue managed by the cluster memory controller 700, preparing data(A) for writing, e.g., by segmenting it, encoding it, and the like, based on a recording protocol, for instance, followed by actually recording data(A) in the cluster memory. Additionally, the cluster memory controller 700 generates a response packet 140b" based on the response packet definition.

Once the write operation has been committed, or equivalently, the write operation is in such a state that any future access of those memory locations will return the values of data(A) as the ones included in the WWR packet 140d, and that any side-effects of the write operation will be correctly presented to future accesses, then, at 920 or at 920', the cluster memory controller 700 transmits the response packet 140b" to the notification target computing resource. In some implementations, when the notification target computing resource is the originator computing resource, at 920, the cluster memory controller 700 transmits the response packet 140*b*" back to the processing engine 120-*m*. In some implementations, when the notification target computing resource is another computing resource different from the originator computing resource, at 920', the cluster memory controller 700 transmits the response packet 140*b*" to the other processing engine 120-*n*. As the response packet 140*b*" includes data specifying that data(A) has been written to the cluster memory, the recipient processing engine 120-*m* or 120-*n* can act on data(A), directly or indirectly, by reading, modifying or, in general, causing actions that may or may not directly process data(A) written in the cluster memory, as specified by code operating the processing engine 120-*m* or 120-*n*.

Note that process 900 beneficially provides a superior way to perform a write operation and automatically generate some form of notification upon completion of the write operation, when compared to the conventional process 800. For instance, as part of the conventional process 800, the writing computing resource has to confirm that the write operation has finished by reading, at 820, the written location, and then by confirming the expected value, as part of 830. If the storing computing resource is not on the same network on a chip device as the writing computing resource, then transmission ordering of write packets and read packets between different network on a chip devices is not guaranteed and it may be necessary to delay the read operation or perform multiple read operations until the expected value is returned, in order to confirm the completion of the write operation. If the notification target is a computing resource different from the writing computing resource, the burden on the writing computing resource further increases and issues of packet ordering between different network on a chip devices are further complicated as described above in connection with 820 and 830. Additionally, the writing computing resource has to notify the different computing resource by sending it a response packet, at 840. For these reasons, the sequence 910→920 of process 900 provides write confirmation performance that is at a minimum 33% faster relative to the sequence 810→820→830 of conventional process 800. In situations in which the writing computing resource and the notification target computing resource are different, the confirmation performance can be improved by 50% when the sequence 910→920' of process 900 is performed instead of when the sequence 810→820→830→840 of conventional process 800 is performed. This is so, because the response packet can be transmitted, at 920', by the storing computing resource to any notification target computing resource in the computing system without any additional action to be done by the writing computing resource.

Figure 10A:
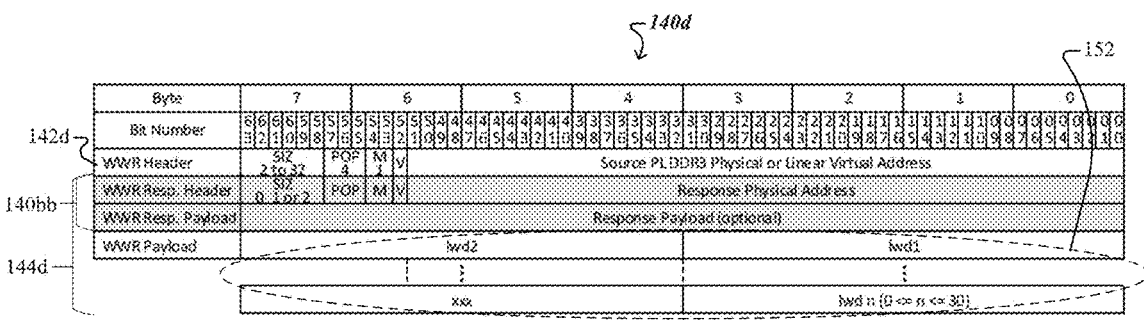
FIGS. 10A-10C show aspects of a first implementation of WWR packets.

FIG. 10A shows aspects of an example of a WWR packet 140*d* that can be used in the process 900 to instruct a computing resource (e.g., cluster memory controller 700) that is a recipient of the WWR packet 140*d* to perform a WWR operation. The WWR packet 140*d* has a header 142*d* and a payload 144*d*. The payload 144*d* includes data 152 to be written in memory associated with the recipient computing resource (or simply the write payload 152) and data 140*bb* specifying a response packet definition (or simply the response packet definition 140*bb*).

Figure 10B:
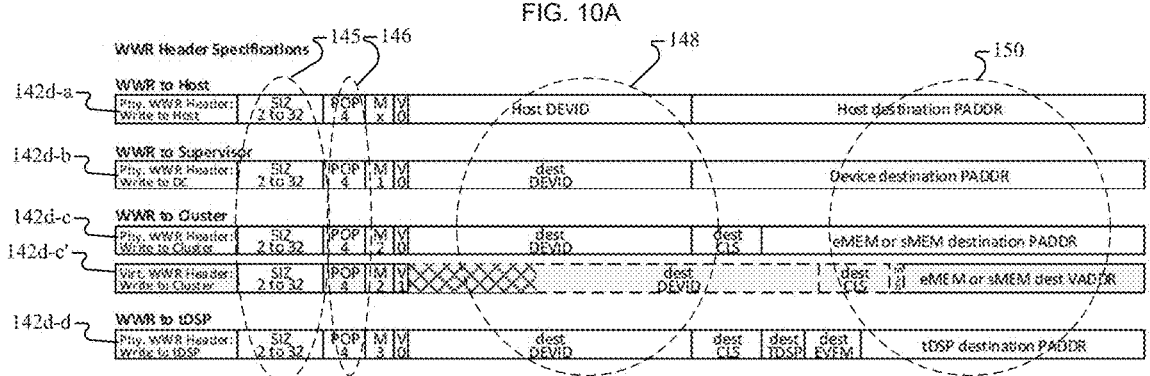

FIG. 10B shows examples of implementations of the header 142*d* of a WWR packet 140*d* that are specific to a type of recipient computing resource. For example, an implementation 142*d*-*a* of the header 142*d* is used in a WWR packet 140*d* to be sent to a host computing resource (e.g., P_Host of computing system 100B). As another example, an implementation 142*d*-*b* of the header 142*d* is used in a WWR packet 140*d* to be sent to a supervisor computing resource. Further, implementations 142*d*-*c* and 142*d*-*c'* are used in respective WWR packets 140*d* to be sent to a cluster controller (e.g., 116). As yet another example, an implementation 142*d*-*d* of the header 142*d* is used in a WWR packet 140*d* to be sent to a processing engine (e.g., 120). Each of a packet interface of the host computing resource, a packet interface of the supervisor computing resource, a packet interface 703 of the cluster memory controller 700, or a packet interface 126 of a processing engine 120 is configured to process the WWR packet 140*d* illustrated in FIG. 10A based on information included in the respective implementations 142*d*-*a*, 142*d*-*b*, 142*d*-*c*, 142*d*-*c'* and 142*d*-*d* of the header.

The information included in each of the implementations 142*d*-*a*, 142*d*-*b*, 142*d*-*c*, 142*d*-*c'* and 142*d*-*d* of the header includes at least packet size information 145, an opcode 146, an ID 148 of the recipient computing resource to which the WWR packet 140*d* is addressed and an address 150 at memory associated with the recipient computing resource. Accordingly, here, a value of the packet size 145 can be a number of longwords (a longword is a 32-bit value) corresponding to the payload 144*d* of the WWR packet 140*d*, including the write payload 152 and the response packet definition 140*bb*. Moreover, the opcode 146 has a value corresponding to a WWR operation and specifies instructions for the recipient computing resource to write the write payload 152 at the memory address 150, and once the write payload has been written to the memory address, to transmit a response packet to a notification target computing resource, based on information in the response packet definition 140*bb*. Further, the ID 148 and the memory address 150 can be provided in any of the forms described above in connection with FIG. 5.

Referring again to FIG. 10A, the response packet definition 140*bb* includes data specifying a header of a response packet to be generated by the recipient computing resource. Optionally, the response packet definition 140*bb* further includes data specifying a payload of the response packet. In some implementations of the network on a chip architecture described above in connection with FIGS. 1-7, a size of a header of a packet is 2 longwords and a size of a payload of the packet is given in multiples of 1 longword, such that a total size of the packet does not exceed 32 longwords. Hence, in this case, the data specifying the header of the response packet has a size of 2 longwords and the data specifying the payload of the response packet has a size of 0 (when a response payload is not present), 1 or 2 longwords. Moreover, the size of the header 142*d* of the WWR packet 140*d* also is 2 longwords and the size of the write payload 152 can be from 0 to 28 longwords. The minimum size of the WWR packet 140*d* is 4 longwords, when there is no write payload 152 and the response packet also has no payload. In this case, the payload 144*d* of the WWR packet 140*d* is two longwords (SIZ=2). A WWR packet 140*d* having a size of 4 longwords is valid. When a WWR packet 140*d* of size 4 longwords is received, the recipient computing resource does not perform a write operation, however it does send a response packet to a notification target specified in the header data of the response packet definition 140*bb*.

Figure 10C:
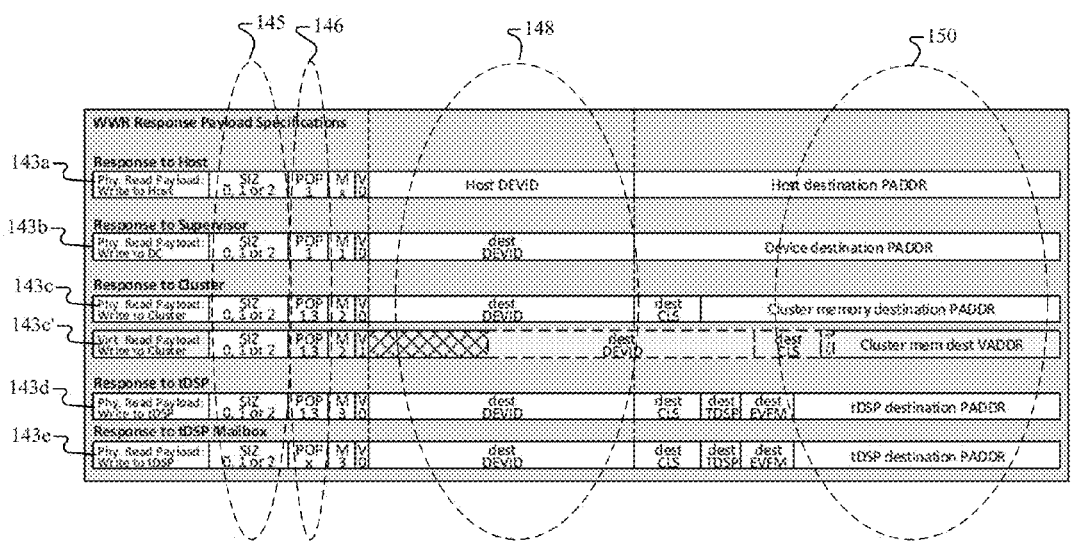

FIG. 10C shows examples of specifications included in the response packet definition 140*bb* that specify a header of a response packet to be generated by the recipient computing resource. Specifications 143*a* or 143*b* are used to generate a header of a response packet to be sent by the recipient computing resource to a host computing resource (e.g., P_Host of computing system 100B) or to a supervisor computing resource. Here, the specifications 143a or 143b include at least response packet size information 145, an opcode 146, an ID 148 of the host computing resource or the supervisor computing resource to which the response packet is to be addressed and an address 150 at memory associated with the host computing resource or the supervisor computing resource. In this case, the opcode 146 has a value corresponding to a "write" operation and specifies an instruction for the host computing resource or for the supervisor computing resource to write data specifying that the write payload 152 included in the payload 144d of the WWR packet 140d has been written in memory associated with the recipient computing resource.

Specifications 143c, 143c', 143d or 143e are used to generate a header of a response packet to be sent by the recipient computing resource to cluster controller (e.g., 116); or to a processing engine (e.g., 120). Here, the specifications 143c, 143c', 143d or 143e include at least response packet size information 145, an opcode 146, an ID 148 of the cluster controller or processing engine to which the response packet is to be addressed and an address 150 at memory associated with the cluster controller or processing engine. In this case, the opcode 146 has a value corresponding to a "write" operation and specifies an instruction for the cluster controller or processing engine to process data specifying that the write payload 152 included in the payload 144d of the WWR packet 140d has been written in memory associated with the recipient computing resource.

Referring again to FIG. 10A, the data specifying that the write payload 152 included in the payload 144d of the WWR packet 140d has been written in memory associated with the recipient computing resource is included in the response packet definition 140bb, either in the payload of the response packet, or in its header, or partially in the header and partially in the payload of the response packet. For example, a physical or virtual memory address where the write payload 152 has been written by the recipient computing resource can be included in the payload of the response packet to be sent by the recipient computing resource to a notification target computing resource. As another example, the arrival of the response packet is sufficient in and as of itself.

Chained WWR operations can be performed to gain further reduction in packet traffic and performance improvements when it is necessary to know whether a set of write operations have been completed, as described below.

Figure 11:
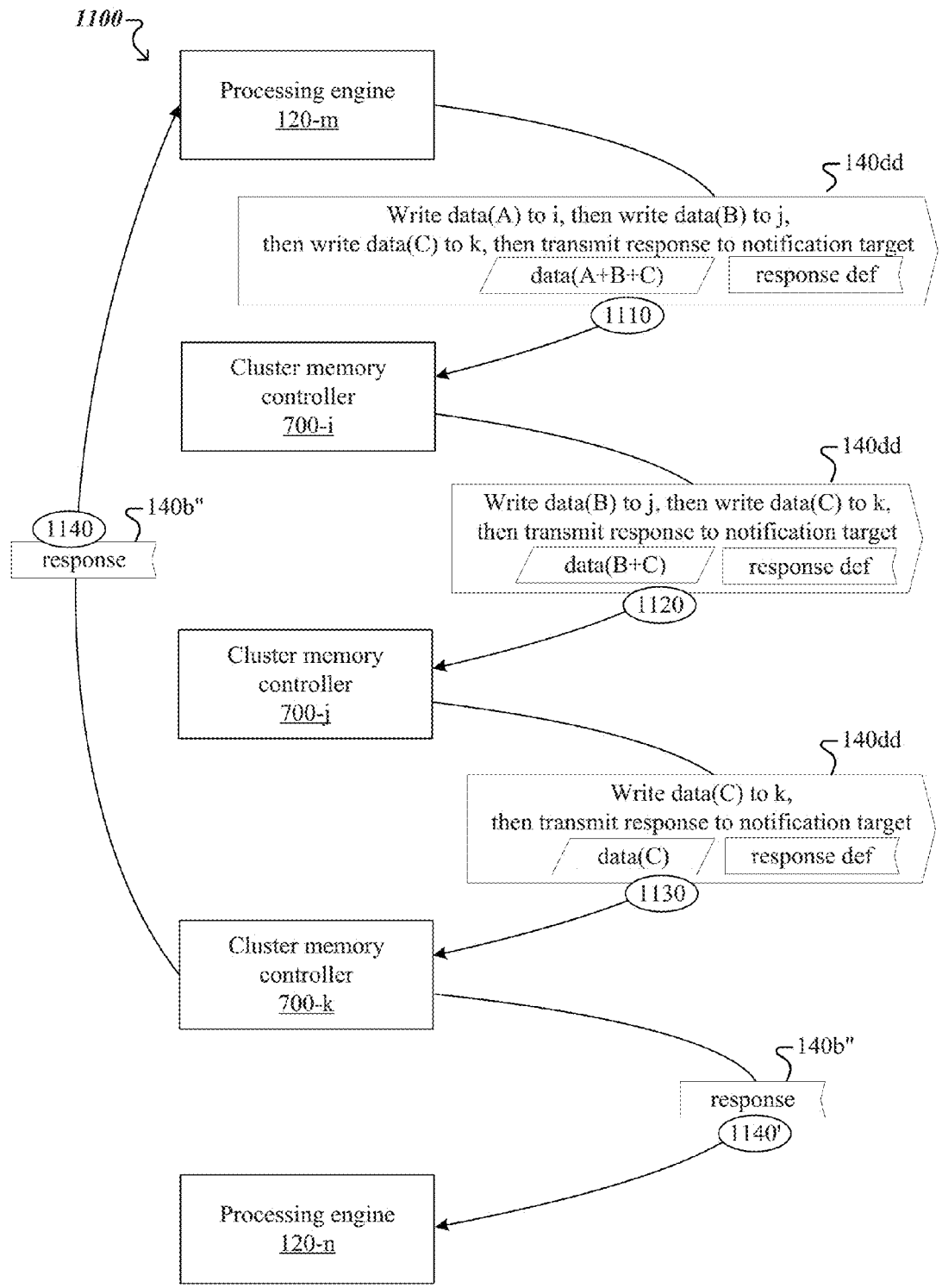
FIG. 11 shows aspects of an example of a process used by an originator computing resource to write multiple data items to respective ones of a series of destination computing resources, using a WWR packet that includes a response packet, the WWR packet being relayed by each destination computing resource in the series to a subsequent destination computing resource, then, by the last destination computing resource to notify a notification target computing resource that the multiple data items have been written, using the response packet included in the relayed WWR packet.

FIG. 11 shows aspects of an example of a process 1100 used by an originator computing resource to write multiple data items to respective ones of a series of destination computing resources, using a WWR packet that includes data specifying a response packet definition, the WWR packet being relayed by each destination computing resource in the series to a subsequent destination computing resource, then, by the last destination computing resource in the series to notify a notification target computing resource that the multiple data items have been written, using a response packet generated based on the response packet definition included in the relayed WWR packet. In some implementations of the process 1100, the originator computing resource, the series of destination computing resources and the notification target computing resource are part of a computing system like the computing system 100 described above in connection with FIG. 1A, the computing system 100A described above in connection with FIG. 2A, or the computing system 100B described above in connection with FIG. 2B. Here, the computing resources involved in the process 1100 can be one or more of a device controller 106, cluster controller 116, AIP 114, super cluster controller 132, processing engine 120, memory controller 700 of cluster memory 118, or other computing resources of the computing system 100, 100A or 100B.

In the example illustrated in FIG. 11, the originator computing resource is a processing engine 120-m, the series of destination computing resources includes a first cluster memory controller 700-i, a second cluster memory controller 700-j, and a third cluster memory controller 700-k, and a notification target computing resource can be either the processing engine 120-m or another processing engine 120-n. Here, one or more cluster memories (e.g., 118) controlled by the respective first, second and third cluster memory controllers 700-i, 700-j and 700-k may be part of the same cluster (e.g., 110) to which one or both of the processing engines 120-m and 120-n belong, or may be part of a different cluster of the same processing device (e.g., 102) or of a different processing device. Moreover, the processing engines 120-m and 120-n may be part of the same cluster, or may be part of different clusters of the same processing device or of a different processing device.

Here, the processing engine 120-m accesses data(A) and data(B) and data(C) in the memory associated with the processing engine. Additionally, at 1110, the processing engine 120-m transmits a first instance of a WWR packet 140dd, that includes data(A), data(B), and data(C) (denoted as data(A+B+C)), and data specifying a response packet definition (or simply the response packet definition), to the first cluster memory controller 700-i. The first instance of the WWR packet 140dd also includes data specifying first instructions for the first cluster memory controller 700-i to write data(A) to the cluster memory controlled by the first cluster memory controller, and then, to send a second instance of the WWR packet 140dd, that includes data(B) and data(C) (denoted as data(B+C)), and the response packet definition, to the second cluster memory controller 700-j. The second instance of the WWR packet 140dd is to include data specifying second instructions for the second cluster memory controller 700-j to write data(B) to the cluster memory controlled by the second cluster memory controller, and then, to send a third instance of the WWR packet 140dd, that includes data(C) and the response packet definition, to the third cluster memory controller 700-k. The third instance of the WWR packet 140dd is to include data specifying third instructions for the third cluster memory controller 700-k to write data(C) to the cluster memory controlled by the third cluster memory controller, and then, to notify, using the response packet definition, a notification target computing resource once data(C) has been written to the cluster memory controlled by the third cluster memory controller. A sequence of WWR operations corresponding to the sequence of first, second and third instances of the WWR packet 140dd is referred to as a chained WWR operation. In response to receiving the first instance of the WWR packet 140dd, the first cluster memory controller 700-i performs an operation of writing data(A) to the cluster memory controlled by the first cluster memory controller. Note that, here, the operation of writing data(A) has the same meaning as described above in connection with FIG. 9. Additionally, the first cluster memory controller 700-i generates the second instance of the WWR packet 140dd based on the first instructions, the second instructions and the third instructions.

Once the operation of writing data(A) has been committed, then, at 1120, the first cluster memory controller 700-i transmits the second instance of the WWR packet 140*dd* to the second cluster memory controller 700-*j*. Here, the second instance of the WWR packet 140*dd* includes data(B+C) and the response packet definition. The second instance of the WWR packet 140*dd* also includes the data specifying the second instructions for the second cluster memory controller 700-*j* to write data(B) to the cluster memory controlled by the second cluster memory controller, and then, to send the third instance of the WWR packet 140*dd*, that includes data(C) and the response packet definition, to the third cluster memory controller 700-*k*. The third instance of the WWR packet 140*dd* is to include data specifying third instructions for the third cluster memory controller 700-*k* to write data(C) to the cluster memory controlled by the third cluster memory controller, and then, to notify, using the response packet definition, a notification target computing resource once data(C) has been written to the cluster memory controlled by the third cluster memory controller. In response to receiving the second instance of the WWR packet 140*dd*, the second cluster memory controller 700-*j* performs an operation of writing data(B) to the cluster memory controlled by the second cluster memory controller. Note that, here, the operation of writing data(B) has the same meaning as described above in connection with FIG. 9. Additionally, the second cluster memory controller 700-*j* generates the third instance of the WWR packet 140*dd* based on the second instructions and the third instructions.

Once the operation of writing data(B) has been committed, then, at 1130, the second cluster memory controller 700-*j* transmits the third instance of the WWR packet 140*dd* to the third cluster memory controller 700-*k*. Here, the third instance of the WWR packet 140*dd* includes data(C) and the response packet definition. The third instance of the WWR packet 140*dd* also includes the data specifying the third instructions for the third cluster memory controller 700-*k* to write data(C) to the cluster memory controlled by the third cluster memory controller, and then, to notify, using the response packet definition, a notification target computing resource once data(C) has been written to the cluster memory controlled by the third cluster memory controller. In response to receiving the third instance of the WWR packet 140*dd*, the third cluster memory controller 700-*k* performs an operation of writing data(C) to the cluster memory controlled by the third cluster memory controller. Note that, here, the operation of writing data(C) has the same meaning as described above in connection with FIG. 9. Additionally, the third cluster memory controller 700-*k* generates a response packet 140*b"* based on the response packet definition.

Once the operation of writing data(C) has been committed, then the third cluster memory controller 700-*k* transmits the response packet 140*b"*, at 1140, back to the processing engine 120-*m*, if the notification target computing resource is the originator computing resource, or, at 1140', to the other processing engine 120-*n*, if the notification target computing resource is another computing resource different from the originator computing resource. As the response packet 140*b"* includes data specifying that data(A) has been written to the cluster memory controlled by the first cluster memory controller 700-*i*, data(B) has been written to the cluster memory controlled by the second cluster memory controller 700-*j*, and data(C) has been written to the cluster memory controlled by the third cluster memory controller 700-*k*, the processing engine 120-*m* or 120-*n*, which is the recipient of the response packet 140*b"*, can act on data(A), data(B) and data(C), directly or indirectly, by reading, modifying or, in general, causing actions that may or may not process data (A), data(B) and data(C) written in the respective cluster memory, as specified by code operating the recipient processing engine 120-*m* or 120-*n*.

Chained WWR operations like the ones described above in connection with FIG. 11 can be performed to potentially realize one or more of the following advantages. For example, as part of the conventional process 850 in which the notification target computing resource is the originator computing resource, 3n packets are being exchanged when a sequence of operations includes n write operations, where n≥2. In contrast, only n+1 packets are being exchanged when a sequence of operations that includes n write operations is performed as part of process 1100, leading to a minimum packet traffic improvement of 3n/(n+1). As another example, as part of the conventional process 850 in which the notification target computing resource is different from the originator computing resource, 3n+1 packets are being exchanged when a sequence of write operations includes n writes. Once again, only n+1 packets are being exchanged when a sequence of operations that includes n write operations is performed as part of process 1100, leading to a minimum packet traffic improvement of (3n+1)/(n+1).

Note that a conventional packet 140*a*, 140*b*, 140*b"* (described above in connection with FIGS. 8C-8E) corresponds to a single operation such as a read, a write, etc. As one conventional packet has one and only one header, with a single operation code specified in that header, the conventional packet is associated with one operation corresponding the specified operation code. In contrast, a single WWR packet may include a concatenation of multiple operation codes, and hence can be associated with a corresponding sequence of chained WWR operations. In this manner, processing of a WWR packet can cause the following chained WWR operations.

The WWR packet is sent from an originator computing resource to a first recipient computing resource (also referred to as the first intermediary computing resource) specified in a first header, located at the start of the WWR packet. Upon receipt of the WWR packet, the first recipient computing resource performs an operation corresponding to an operation code specified in the first header. Next, a first portion of the WWR packet (which includes the first header) is discarded and a second header carried in a payload of the WWR packet is used as the header of an updated instance of the WWR packet (also referred to as the updated WWR packet). If the second header also is addressed for the first recipient computing resource, the updated WWR packet is handled in place. However, if the second header is addressed for a second recipient computing resource (also referred to as the second intermediary computing resource), the first recipient computing resource now acts as the originator computing resource of the updated WWR packet, and sends the updated WWR packet to the second recipient computing resource. Each subsequent header (with its respective operation code) carried in the payload of the WWR packet can be seen as a link in a chain of WWR packet transmissions, from the originator computing resource to the first intermediary computing resource, then to the second intermediary computing resource, to a third intermediary computing resource, and so on until all of the operations specified in the headers carried in the payload of the WWR packet have been exhausted.

In this manner, a WWR packet that causes a chained WWR operation is made up of "link" WWR packets. Characteristics of the WWR packet are: (i) a header of the WWR packet, as well as every link header carried in the payload of the WWR packet, corresponds to a WWR operation; and (ii) accompanying each WWR link, there may be a respective write payload which is to be written to a memory location specified in the corresponding link header. In some implementations, a WWR packet includes one and only one response packet header, and, optionally, there is a payload associated with the response header. When a WWR packet arrives at a recipient computing resource specified by the current WWR packet header, memory address information in the current header is used to write the corresponding payload data. Once completed, the processing logic at that recipient computing resource strips off the current header and its corresponding payload (which has just been written) to reveal the next link header. The WWR packet updated in this manner is then processed exactly the same way as for the previous WWR link. As such, the chained WWR operation is performed by receiving a WWR packet, performing a write operation corresponding to the current link, then processing the remaining links in sequential manner until a response packet is all that is left in the payload of the WWR packet. The response packet is then sent from the last recipient computing resource to a notification target computing resource, where the response packet is processed, thus ending the lifecycle of the WWR packet associated with a chained WWR operation. There are many ways in which these characteristics can be implemented, depending on the WWR packet header and design of network on a chip architecture. Examples of possible implementations are described next.

Figure 12A:
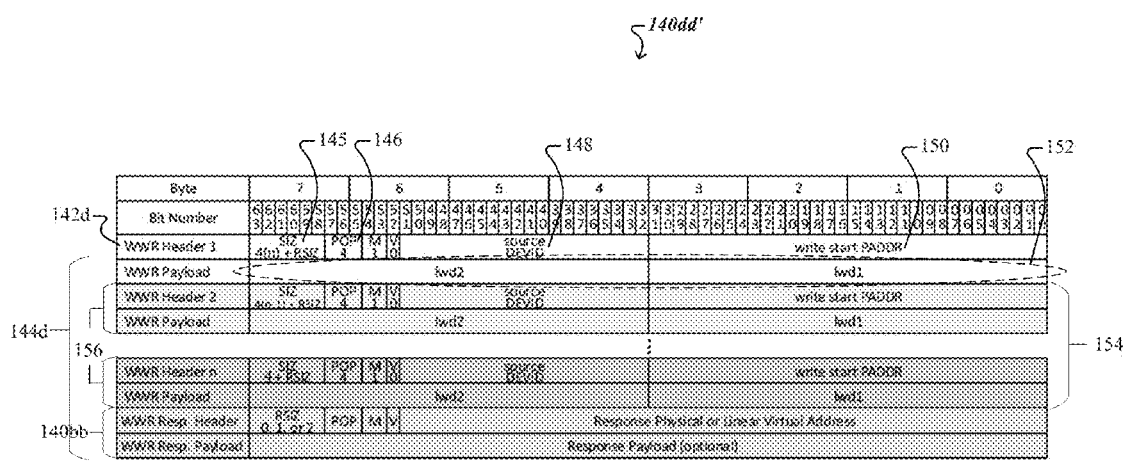
FIG. 12A shows aspects of a second implementation of WWR packets.
Figure 12B:
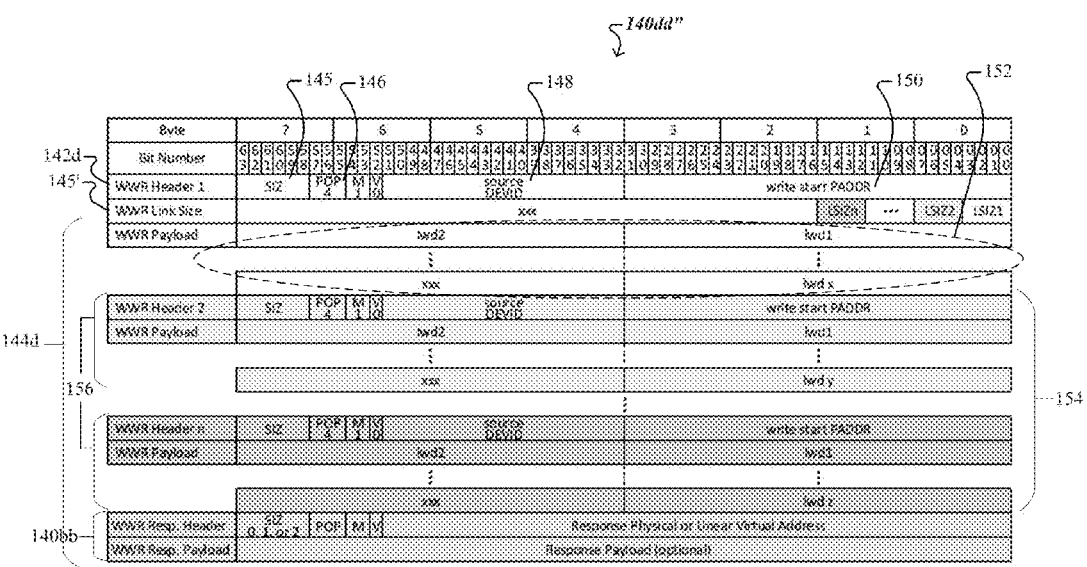
FIG. 12B shows aspects of a third implementation of WWR packets.

FIG. 12A and FIG. 12B show aspects of respective examples of a WWR packet 140$dd'$ and a WWR packet 140$dd''$ that can be used in the process 1100 to instruct multiple computing resources (e.g., cluster memory controllers 700-$i$, 700-$j$, 700-$k$) that are sequential recipients of the WWR packet 140$dd'$ or the WWR packet 140$dd''$ to perform a chained WWR operation, like the one described above in connection with FIG. 11. Each of the WWR packet 140$dd'$ and the WWR packet 140$dd''$ has a header 142$d$ and a payload 144$d$. A current instance of the payload 144$d$ includes data 152 to be written in memory associated with a recipient computing resource to which the current instance of the WWR packet 140$dd'$ or the WWR packet 140$dd''$ is addressed (referred to as the write payload 152), data 154 associated with respective different recipient computing resources to which respective different instances of the WWR packet 140$dd'$ or the WWR packet 140$dd''$ will be subsequently addressed (referred to as link data 154), and data 140$bb$ specifying a response packet definition (or simply the response packet definition 140$bb$).

The header 142$d$ includes at least packet size information 145, an opcode 146, an ID 148 of the recipient computing resource to which the current instance of the WWR packet 140$dd'$ or the WWR packet 140$dd''$ is addressed and an address 150 at memory associated with the identified recipient computing resource. Here, the ID 148 and the memory address 150 can be provided in any of the forms described above in connection with FIG. 5. Further, a value SIZ of the packet size 145 can be a number of longwords in a corresponding instance of the payload 144$d$ including the write payload 152, the link data 154, and the response packet definition 140$bb$. Moreover, the opcode 146 has a value corresponding to a WWR operation and specifies instructions for the recipient computing resource (i) to write the write payload 152 at the memory address 150, and to update either the current instance of the WWR packet 140$dd'$ or the WWR packet 140$dd''$ based on the link data 154 or, if the recipient computing resource is a last one in a series of recipient computing resources, to generate a response packet based on the response packet definition 140$bb$; and (ii) once the write payload has been written to the memory address 150, to transmit either (I) the updated WWR packet 140$dd'$ or the updated WWR packet 140$dd''$ to a subsequent recipient computing resource referenced in the link data 154, or (II) the response packet to a notification target computing resource referenced in the response packet definition 140$bb$, if the recipient computing resource is the last recipient computing resource.

The response packet definition 140$bb$ includes data specifying a header of a response packet to be generated by the last recipient computing resource of the WWR packet 140$dd'$ or the WWR packet 140$dd''$. The data specifying the header of the response packet has been described in detail in connection with FIG. 10C. Optionally, the response packet definition 140$bb$ also includes data specifying a payload of the response packet.

The link data 154 includes multiple WWR data items 156 corresponding to write operations to be performed as part of a chained WWR operation with which the WWR packet 140$dd'$ or the WWR packet 140$dd''$ is associated. Each WWR data item 156 includes header data (denoted WWR Header j, where j≥2) and payload data (denoted WWR Payload associated with Header j). The header data of the WWR data item 156 can include packet size information for a corresponding instance of the WWR packet 140$dd'$ or the WWR packet 140$dd''$, a WWR opcode, an ID of the recipient computing resource to which the corresponding instance of the WWR packet 140$dd'$ or the WWR packet 140$dd''$ is addressed and an address at memory associated with the identified recipient computing resource. The payload data of the WWR data item 156 is to be written by the identified recipient computing resource at the associated memory address.

In some implementations of the WWR packet 140$dd'$ like the one shown in FIG. 12A, each of the write payload 152 and the payload data of each of the WWR data items 156 is restricted to a fixed size. Here, the fixed size is 2 longwords. A payload 144$d$ of the WWR packet 140$dd'$ which only includes the write payload 152 and no WWR data items 156 has a minimum size of 4 longwords—totaled from 2 longwords of the write payload 152 and 2 longwords of a response packet definition 144$bb$ without a response payload. Each additional WWR data item 156 requires an additional 4 longwords—2 longwords corresponding to the header data and 2 longwords corresponding to the fixed size payload data of the WWR data item 156. In this manner, a WWR packet 140$dd'$ associated with a chained WWR operation that includes n write operations has a payload size SIZ of (4n+RSIZ) longwords, where a size (in longwords) of the response packet payload is RSIZ (the latter as specified in the response packet definition 144$bb$). In implementations in which the maximum size of the payload 144$d$ of a WWR packet 104$dd'$ is 32 longwords, there can be a maximum of 7 write operations included in a chained WWR operation with which the WWR packet 104$dd'$ is associated, if RSIZ>0, or a maximum of 8 write operations, if RSIZ=0.

In this manner, a first recipient computing resource receives, from an originator computing resource, a first instance of a WWR packet 140$dd'$ as shown in FIG. 12A. Responsive to receipt of the first instance of the WWR packet 140$dd'$, the first recipient computing resource (identified by first ID 148 included in the first header 142$d$—denoted here as WWR header 1) writes a write payload 152 at a first memory address 150 (specified in the first header 142$d$). Then, the first recipient computing resource strips off the first header 142*d* and the write payload 152, and sends an updated WWR packet 140*dd'* into the network on a chip architecture to a second recipient computing resource identified in header data (denoted WWR header 2) of the next WWR data item 156. This process is repeated at each of the recipient computing resources until a last WWR data item 156 is processed by a last one of the recipient computing resources identified in header data (denoted WWR header n) of the last WWR data item 156. The last ($n^{th}$) recipient computing resource also generates a response packet, having a response payload with a size of 0, 1 or 2 longwords (as specified in the header data—denoted WWR Response header—of the response packet definition 140*bb*), and sends the response packet to a notification target computing resource (also identified in the header data).

In some implementations of the WWR packet 140*dd''* like the one shown in FIG. 12B, the write payload 152 and the payload data of each of the WWR data items 156 have variable sizes. Here, size information 145' (denoted as WWR link size) is included in the payload 144*d* and specifies a number of longwords in the write payload 152 and respective numbers of longwords in the payload data of the WWR data items 156. In this manner, the size information 145' includes n values (denoted LSIZ1, . . . , LSIZn) corresponding to the n write operations included in a chained WWR operation with which the WWR packet 140*dd''* is associated.

In this manner, a first recipient computing resource receives, from an originator computing resource, a first instance of a WWR packet 140*dd''* as shown in FIG. 12B. Responsive to receipt of the first instance of the WWR packet 140*dd''*, the first recipient computing resource (identified by first ID 148 included in the first header 142*d*—denoted WWR header 1) writes a write payload 152 (having a number of longwords specified by LSIZ1) at a first memory address 150 (specified in the first header 142*d*). Further, the first recipient computing resource updates the WWR packet 140*dd''* by stripping off the first header 142*d* and the write payload 152 (rounded to next 64-bit boundary).

Additionally, the first recipient computing resource determines a size (denoted as PKTSIZE) of the updated WWR packet 140*dd''* based on a difference between a first size 145 of the payload 144*d* and the size (LSIZ1) of the write payload 152: PKTSIZE=(WWR Header 1 SIZ)−((LSIZ1+1)/2). Next, the first recipient computing resource determines whether a difference between the size of the updated WWR packet 140*dd''* and the size of the WWR Link Size field 145' (which is 2 longwords) is greater than 4: (PKTSIZE−2)≥4. If the difference is equal to 4, then only the response packet definition 140*bb* remains in the payload 144*d*. In this case, the first recipient computing resource generates a response packet based on the response packet definition 140*bb* and sends the response packet to a notification target computing resource identified in header data (denoted WWR Response header) of the response packet definition 140*bb*, ending, in this manner, the life cycle of the chained WWR operation with which the WWR packet 140*dd''* is associated. Else, if the difference is greater than 4, then header 142 of the updated WWR packet 140*dd''* is filled with values from WWR Header 2. Here, a value of the packet size 145 of WWR Header 2 is set to PKTSIZE. Further, the WWR Link Size 145' is shifted to remove LSIZ1 and position LSIZ2 at the end of the WWR Link Size 145'. Furthermore, the payload data 152 of the updated WWR packet 140*dd''* is filled with the payload data of WWR data item 156 associated with WWR Header 2.

In case a recipient computing resource identified by the ID 148 of WWR Header 2 is the same as the first recipient computing resource, then the first recipient computing resource writes the write payload 152 (having a number of longwords specified by LSIZ2) at a memory address 150 (specified in WWR Header 2). In case the recipient computing resource identified by the ID 148 of WWR Header 2 is different from the first recipient computing resource, then the first recipient computing resource sends the updated WWR packet 140*dd''* into the network on a chip architecture to a second recipient computing resource identified in WWR Header 2. This process is repeated at each of the recipient computing resources until a last WWR data item 156 is processed by a last one of the recipient computing resources identified in header data (denoted WWR header n) of the last WWR data item 156. The last recipient computing resource also generates a response packet based on the response packet definition 140*bb* and sends the response packet to a notification target computing resource identified in header data (denoted WWR Response header) of the response packet definition 140*bb*.

Although the WWR packet 140*dd''* shown in FIG. 12B may not make optimal use of available space in the payload 144*d*, since payload data of the WWR data items 156 having an odd number of longwords require a longword for padding, this implementation of the WWR packet 140*dd''* could simplify logic relating to each writing operation of a chained WWR operation. A different implementation of a WWR packet could pack the payload data of the WWR data items 156, which would increase a maximum number of write operations included in a chained WWR operation with which the WWR packet is associated.

As described above in connection with FIG. 10A, the response definition 140*bb* includes data specifying a payload of the response packet to be generated by the last recipient computing resource. In the examples illustrated in FIG. 12A and in FIG. 12B, data specifying that the first write payload 152 as well the payload data of each of the WWR data items 156 from the link data 154 have been written in memories associated with respective recipient computing resources can be included in the response packet definition 140*bb*, either in the payload data (denoted as WWR Response Payload), or in its header data (denoted as WWR Response Header), or partially in the header data and partially in the payload data of the response packet definition. In this manner, data specifying physical or virtual memory addresses where the first write payload 152 and the payload data of each of the WWR items 156 have been written by the respective recipient computing resources can be included in the payload of a response packet, generated based on the response packet definition 140*bb*, to be sent by the last one of the recipient computing resources to a notification target computing resource.

Note that each of the chained WWR operations described above in connection with FIGS. 11, 12A and 12B includes a sequence of n writing operations followed by a single operation of notifying a notification target computing resource. Another chained WWR operation which includes a sequence of n writing operations, each of the writing operations being followed by an operation of notifying a respective notification target computing resource, is described next.

Figure 13:
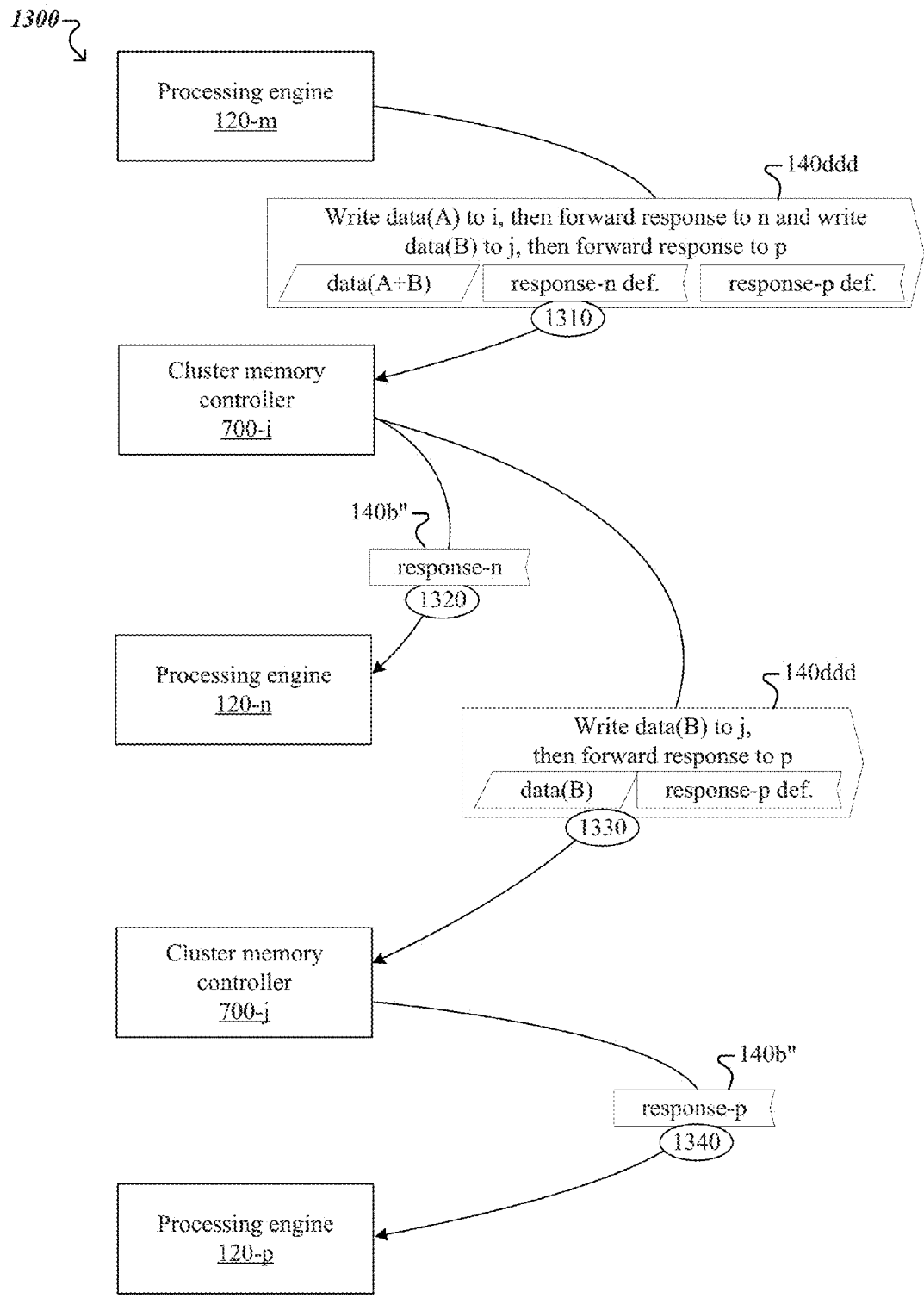
FIG. 13 shows aspects of an example of a process used by an originator computing resource to write multiple data items to respective ones of a series of destination computing resources, using a WWR packet that includes multiple response packet, the WWR packet being relayed by each destination computing resource in the series to a subsequent destination computing resource, and, by each destination computing resource to notify a respective notification target computing resource of the writing of the ones among the multiple data items that have been written, using an associated response packet included in the relayed WWR packet.

FIG. 13 shows aspects of an example of a process 1300 used by an originator computing resource to write multiple data items to respective ones of a series of destination computing resources, using a WWR packet that includes data specifying multiple response packet definitions, the WWR packet being relayed by each destination computing resource in the series to a subsequent destination computing resource, and by each destination computing resource to notify a respective notification target computing resource from among a series of notification target computing resources of the writing of the ones among the multiple data items that have been written, using an associated response packet generated based on the response packet definitions included in the relayed WWR packet. In some implementations of the process 1300, the originator computing resource, the series of destination computing resources and the series of notification target computing resources are part of a computing system like the computing system 100 described above in connection with FIG. 1A, the computing system 100A described above in connection with FIG. 2A, or the computing system 100B described above in connection with FIG. 2B. Here, the computing resources involved in the process 1300 can be one or more of a device controller 106, cluster controller 116, AIP 114, super cluster controller 132, processing engine 120, memory controller 700 of cluster memory 118, or other computing resources of the computing system 100, 100A or 100B.

In the example illustrated in FIG. 13, the originator computing resource is a first processing engine 120-*m*, the series of destination computing resources includes a first cluster memory controller 700-*i* and a second cluster memory controller 700-*j*, and the series of notification target computing resources includes a second processing engine 120-*n* and a third processing engine 120-*p*. Here, one or more cluster memories (e.g., 118) controlled by the respective first and second cluster memory controllers 700-*i* and 700-*j* may be part of the same cluster (e.g., 110) to which one or more of the first, second and third processing engines 120-*m*, 120-*n* and 120-*p* belong, or may be part of a different cluster of the same processing device (e.g., 102) or of a different processing device. Moreover, the first, second and third processing engines 120-*m*, 120-*n* and 120-*p* may be part of the same cluster, or may be part of different clusters of the same processing device or of a different processing device.

Here, the first processing engine 120-*m* accesses data(A) and data(B) in the memory associated with the first processing engine. Additionally, at 1310, the processing engine 120-*m* transmits a first instance of a WWR packet 140*ddd*, that includes data(A) and data(B) (denoted as data(A+B)), and data specifying definitions of a first response packet and a second response packet (or simply the first response packet definition—denoted response-n def.—and the second response packet definition—denoted response-p def.), to the first cluster memory controller 700-*i*. The first instance of the WWR packet 140*ddd* also includes data specifying first instructions for the first cluster memory controller 700-*i* to write data(A) to the cluster memory controlled by the first cluster memory controller, and then, to notify, using the first response packet definition, the second processing engine 120-*n* that data(A) has been written to the cluster memory controlled by the first cluster memory controller, and to send a second instance of the WWR packet 140*ddd*, that includes data(B) and the second response packet definition, to the second cluster memory controller 700-*j*. The second instance of the WWR packet 140*ddd* is to include data specifying second instructions for the second cluster memory controller 700-*j* to write data(B) to the cluster memory controlled by the second cluster memory controller, and then, to notify, using the second response packet definition, the third processing engine 120-*p* that data(A) has been written to the cluster memory controlled by the first cluster memory controller 700-*i* and data(B) has been written to the cluster memory controlled by the second cluster memory controller. A sequence of WWR operations corresponding to the sequence of first and second instances of the WWR packet 140*ddd* is defined as a chained WWR operation.

In response to receiving the first instance of the WWR packet 140*ddd*, the first cluster memory controller 700-*i* performs an operation of writing data(A) to the cluster memory controlled by the first cluster memory controller. Note that, here, the operation of writing data(A) has the same meaning as described above in connection with FIG. 9. Additionally, the first cluster memory controller 700-*i* generates the second instance of the WWR packet 140*ddd* based on the first instructions and the second instructions, and a first response packet 140*b*" based on the first response packet definition.

Once the operation of writing data(A) has been committed, then the first cluster memory controller 700-*i* transmits, at 1320, the first response packet 140*b*" to the second processing engine 120-*n*. Note that as the first response packet 140*b*" includes data specifying that data(A) has been written to the cluster memory controlled by the first cluster memory controller 700-*i*, the second processing engine 120-*n* can act on data(A), directly or indirectly, by reading, modifying or, in general, causing actions that may or may not directly process data(A) written in the cluster memory controlled by the first cluster memory controller, as specified by code operating the second processing engine 120-*n*. In some implementations (not shown in FIG. 13), the first cluster memory controller 700-*i* transmits the first response packet 140*b*" back to the first processing engine 120-*m*. Referring again to FIG. 13, at 1330, the first cluster memory controller 700-*i* transmits the second instance of the WWR packet 140*ddd* to the second cluster memory controller 700-*j*. Here, the second instance of the WWR packet 140*ddd* includes data(B) and the second response packet definition. The second instance of the WWR packet 140*ddd* also includes the data specifying the second instructions for the second cluster memory controller 700-*j* to write data(B) to the cluster memory controlled by the second cluster memory controller, and then, to notify, using the second response packet definition, the third processing engine 120-*p* once data(B) has been written to the cluster memory controlled by the second cluster memory controller.

In response to receiving the second instance of the WWR packet 140*ddd*, the second cluster memory controller 700-*j* performs an operation of writing data(B) to the cluster memory controlled by the second cluster memory controller. Note that, here, the operation of writing data(B) has the same meaning as described above in connection with FIG. 9. Additionally, the second cluster memory controller 700-*j* generates a second response packet 140*b*" based on the second response packet definition.

Once the operation of writing data(B) has been committed, then the second cluster memory controller 700-*j* transmits, at 1340, the second response packet 140*b*" to the third processing engine 120-*p*. Note that as the second response packet 140*b*" includes data specifying that data(A) has been written to the cluster memory controlled by the first cluster memory controller 700-*i* and data(B) has been written to the cluster memory controlled by the second cluster memory controller 700-*j*, the third processing engine 120-*p* can act on data(A) and data(B), directly or indirectly, by reading, modifying or, in general, causing actions that may or may not directly process data(A) and data(B) written in respective cluster memory, as specified by code operating the third processing engine 120-*p*. In some implementations (not shown in FIG. 13), the second cluster memory controller 700-*j* transmits the second response packet 140*b*" back to the first processing engine 120-*m*.

Figure 14A:
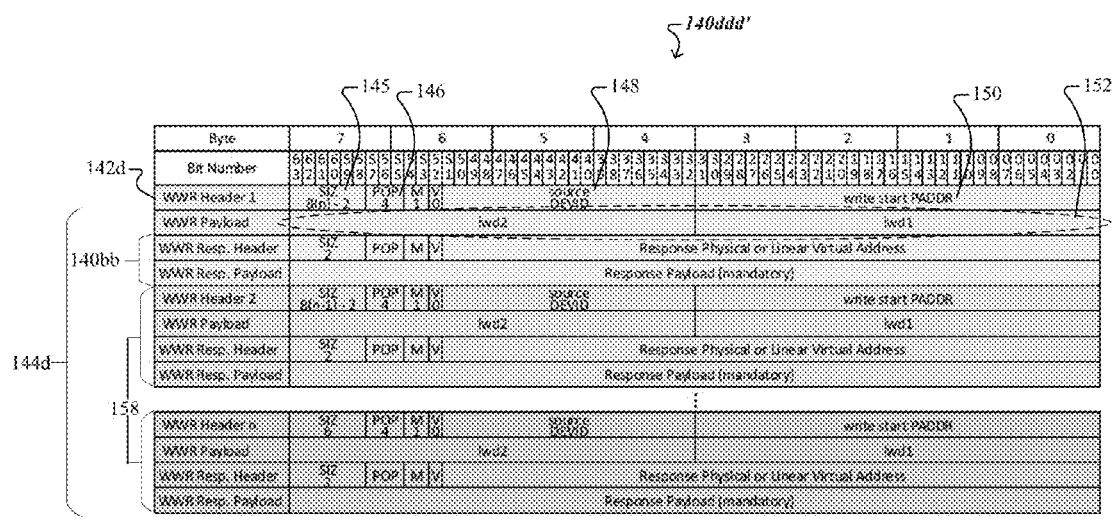
FIG. 14A shows aspects of a fourth implementation of WWR packets.
Figure 14B:
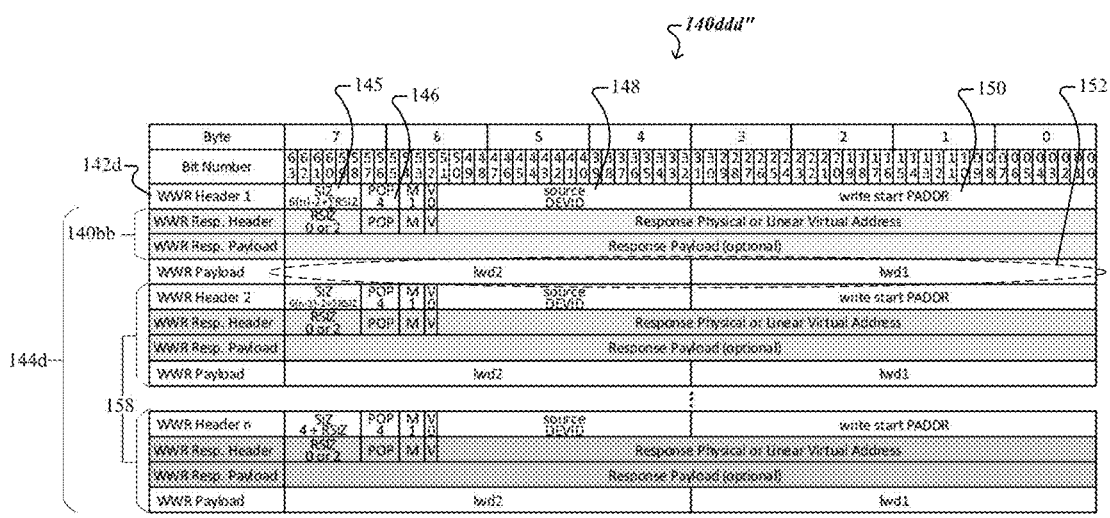
FIG. 14B shows aspects of a fifth implementation of WWR packets.

FIG. 14A and FIG. 14B show aspects of an example of a WWR packet 140*ddd'* and a WWR packet 140*ddd"* that can be used in the process 1300 to instruct multiple computing resources (e.g., cluster memory controllers 700-*i* and 700-*j*) that are sequential recipients of the WWR packet 140*ddd'* or the WWR packet 140*ddd"* to perform a chained WWR operation, like the one described above in connection with FIG. 13. Each of the WWR packet 140*ddd'* and the WWR packet 140*ddd"* has a header 142*d* and a payload 144*d*. A current instance of the payload 144*d* includes data 152 to be written in memory associated with a recipient computing resource to which the current instance of the WWR packet 140*ddd'* or the WWR packet 140*ddd"* is addressed (referred to as the write payload 152), data 140*bb* specifying a current response packet definition (or simply the current response packet definition 140*bb*), and multiple WWR data items 158 corresponding to respective WWR operations to be subsequently performed as part of a chained WWR operation with which the WWR packet 140*ddd'* or the WWR packet 140*ddd"* is associated.

The header 142*d* (denoted here as WWR Header 1) includes at least packet size information 145, an opcode 146, an ID 148 of the recipient computing resource to which the current instance of the WWR packet 140*ddd'* or the WWR packet 140*ddd"* is addressed and an address 150 at memory associated with the identified recipient computing resource. Here, the ID 148 and the memory address 150 can be provided in any of the forms described above in connection with FIG. 5. Further, a value of the packet size 145 can be a number of longwords in a corresponding instance of the payload 144*d* including the write payload 152 (denoted here as WWR Payload associated with WWR Header 1), the current response packet definition 140*bb*, and WWR data items 158. Moreover, the opcode 146 has a value corresponding to a WWR operation and specifies instructions for the recipient computing resource (i) to write the write payload 152 to the memory address 150, to update either the current instance of the WWR packet 140*ddd'* or the WWR packet 140*ddd"* based on a subsequent WWR data item 158, and to generate a current response packet based on the current response packet definition 140*bb*; and (ii) once the write payload 152 has been written to the memory address 150, to transmit (I) either the updated WWR packet 140*ddd'* or the updated WWR packet 140*ddd"* to a subsequent recipient computing resource referenced in the subsequent WWR data item 158, and (II) the current response packet to a notification target computing resource referenced in the current response packet definition 140*bb*.

Moreover, the current response packet definition 140*bb* includes data specifying a header (denoted here as WWR Response Header associated with WWR Header 1) of a current response packet to be generated by the current recipient computing resource of the WWR packet 140*ddd'* or the WWR packet 140*ddd"*. The data specifying the header of the current response packet is similar to the specifications 143*a*, 143*b*, . . . , described in detail in connection with FIG. 10C. The current response packet definition 140*bb* also includes, for the WWR packet 140*ddd'*, data specifying a mandatory payload of the response packet, and, for the WWR packet 140*ddd"*, data specifying an optional payload of the response packet, where each of these response packet payloads is denoted here as WWR Response Payload associated with WWR Header 1.

Each WWR data item 158 includes respective header data, respective write payload data and respective response packet definition. Here, the header data (denoted here as WWR Header j, where j=2 . . . n) of the j*th* WWR data item 158 includes the same fields as the ones of the header 142*d* (WWR Header 1) described in detail above, except field values of WWR Header j correspond to the j*th* recipient computing resource that will carry out the j*th* WWR operation corresponding to the j*th* WWR data item 158. Further, write payload data (denoted here as WWR Payload associated with WWR Header j, where j=2 . . . n) of the j*th* WWR data item 158 is to be written by the j*th* recipient computing resource to memory specified in WWR Header j. Note that in the examples illustrated in FIG. 14A and FIG. 14B, each of the write payload data of the j*th* WWR data item 158 (as well as the write payload 152) is restricted to a fixed size of 2 longwords. Furthermore, the response packet definition of the j*th* WWR data item 158 is similar to the one of the response packet definition 140*bb* described in detail above, except definition values correspond to the j*th* notification target computing resource to which a response packet is to be sent as part of the j*th* WWR operation corresponding to the j*th* WWR data item 158.

The WWR packet 140*ddd'* illustrated in FIG. 14A can be obtained by modifying the WWR packet 140*dd'* illustrated in FIG. 12A to include a return packet definition for each WWR operation in a sequence of n WWR operations, rather than a single return packet definition for an entire sequence of n write operations. Additionally, in the example of the WWR packet 140*ddd'* shown in FIG. 14, the response packet definition 140*bb* specifies a mandatory payload of the response packet having a size of 2 longwords. A payload 144*d* of the WWR packet 140*ddd'* which only includes the write payload 152 and no WWR data items 156 has a size of 6 longwords—totaled from 2 longwords of the write payload 152 and 4 longwords of a response packet definition 144*bb* (i.e., 2 longwords of the response header and 2 longwords of the response payload). Each additional j*th* WWR data item 158 requires an additional 8 longwords—2 longwords corresponding to the header data (in WWR Header j), 2 longwords corresponding to the fixed size payload data of the j*th* WWR data item (in corresponding WWW Payload) and 4 longwords in corresponding response packet definition 140*bb* (i.e., 2 longwords of the response header and 2 longwords of the response payload). In this manner, a WWR packet 140*ddd'* associated with a chained WWR operation that includes n WWR operations has a payload size of (8n−2) longwords. In implementations in which the maximum size of the payload 144*d* of a WWR packet 104*ddd* is 32 longwords, there can be a maximum of 4 WWR operations included in a chained WWR operation with which the WWR packet 104*ddd'* is associated.

In the example illustrated in FIG. 14B, the response packet definition 140*bb* of each instance j of the WWR data items 158 of the WWR packet 140*ddd"*, where j=1 . . . n, includes data specifying an optional payload of the response packet (denoted here as WWR Response Payload associated with WWR Header j) having a size RSIZ(j)=0 or 2 longwords. A payload 144*d* of the WWR packet 140*ddd"* which only includes the write payload 152 and no WWR data items 156 has a size of (4+RSIZ(1)) longwords—totaled from 2 longwords of the write payload 152 and (2+RSIZ(1)) longwords of the response packet definition 144*bb* (i.e., 2 longwords of the response header and RSIZ(1) longwords of the response payload). Each additional j*th* WWR data item 158 requires an additional (6+RSIZ(j)) longwords—2 longwords corresponding to the header data (in WWR Header j), 2 longwords corresponding to the fixed size payload data of the $j^{th}$ WWR data item (in corresponding WWW Payload) and (2+RSIZ(j)) longwords in corresponding response packet definition 140bb (i.e., 2 longwords of the response header and RSIZ(j) longwords of the response payload). In this manner, a WWR packet 140ddd''' associated with a chained WWR operation that includes n WWR operations has a payload size of (6n−2+ΣRSIZ(j)) longwords, where ΣRSIZ(j)=RSIZ(j+1)+ . . . +RSIZ(n) is the sum of the response payloads specified in the remaining response packet definitions 140bb in the $j^{th}$ instance of the WWR packet 140ddd'''. In implementations in which the maximum size of the payload 144d of a WWR packet 104ddd is 32 longwords, there can be a maximum of 5 WWR operations included in a chained WWR operation with which the WWR packet 104ddd''' is associated, for cases in which no fewer than three of all response payloads are omitted, or a maximum of 4 WWR operations, otherwise.

The WWR packet 140ddd' or the WWR packet 140ddd''' can be used in the following manner. A first instance of the WWR packet 140ddd' or the WWR packet 140ddd''', generated by an originator computing resource as shown in FIG. 14, is transmitted to a first recipient computing resource. Responsive to receipt of the first instance of either the WWR packet 140ddd' or the WWR packet 140ddd''', the first recipient computing resource (identified by ID 148 in WWR Header 1) writes a write payload 152 at a first memory address 150 (specified in WWR Header 1). Also, the first recipient computing resource strips off the first header 142d and the write payload 152 to update the respective WWR packet 140ddd' or the WWR packet 140ddd''', and generates a first response packet based on the response packet definition 140bb. Once the writing operation of the write payload 152 has been committed, the first recipient computing resource transmits the first response packet to a first notification target computing resource identified in header data (denoted WWR Response header) of the response packet definition 140bb, and either the updated WWR packet 140ddd' or the WWR packet 140ddd''' into the network on a chip architecture to a second recipient computing resource identified in header data (denoted WWR header 2) of the next WWR data item 158. This process is repeated at each of the recipient computing resources until all WWR data items 158 from the WWR packet 140ddd have been processed.

In some implementations, a $j^{th}$ response packet (e.g., 140b'') transmitted by a $j^{th}$ recipient computing resource to a $j^{th}$ notification target computing resource as part of the $j^{th}$ WWR operation corresponding to the $j^{th}$ WWR data item 158 in the WWR packet 140ddd' or the WWR packet 140ddd''' can include data specifying physical or virtual memory addresses where the $1^{st}$, $2^{nd}$, . . . , and $j^{th}$ write payloads of the first j WWR items 158 have been written by the respective first j recipient computing resources, for each j=1 . . . n. In this manner, in the case of the WWR packet 140ddd', a data occupancy factor of a response packet 140b'' can increase with each subsequent WWR operation. For example, for a sequence of n response packets corresponding to respective n WWR operations included in a chained WWR operation with which the WWR packet 140ddd' is associated, a first response packet has a smallest data occupancy factor, because it includes data specifying physical or virtual memory addresses where only the $1^{st}$ write payload of the WWR packet has been written by the $1^{st}$ recipient computing resource, while a last ($n^{th}$) response packet has a largest data occupancy factor, because it includes data specifying physical or virtual memory addresses where all n write payloads of the WWR packet have been written by the respective n recipient computing resources. Alternatively, in the case of the WWR packet 140ddd''', a size of subsequent instances of a response packet 140b'' having a variable size can increase with each subsequent WWR operation. For example, for a sequence of n response packets corresponding to respective n WWR operations included in a chained WWR operation with which the WWR packet 140ddd''' is associated, a first response packet has a smallest size, because it includes data specifying physical or virtual memory addresses where only the $1^{st}$ write payload of the WWR packet has been written by the $1^{st}$ recipient computing resource, while a last ($n^{th}$) response packet has a largest size, because it includes data specifying physical or virtual memory addresses where all n write payloads of the WWR packet have been written by the respective n recipient computing resources.

In other implementations, a $j^{th}$ response packet (e.g., 140b'') transmitted by a $j^{th}$ recipient computing resource to a $j^{th}$ notification target computing resource as part of the $j^{th}$ WWR operation corresponding to the $j^{th}$ WWR data item 158 in the WWR packet 140ddd' or the WWR packet 140ddd''' can include data specifying physical or virtual memory addresses where only the $j^{th}$ write payload of the $j^{th}$ WWR item 158 has been written by the $j^{th}$ recipient computing resource, for each j=1 . . . n.

In the above description, numerous specific details have been set forth in order to provide a thorough understanding of the disclosed technologies. In other instances, well known structures, interfaces, and processes have not been shown in detail in order to avoid unnecessarily obscuring the disclosed technologies. However, it will be apparent to one of ordinary skill in the art that those specific details disclosed herein need not be used to practice the disclosed technologies and do not represent a limitation on the scope of the disclosed technologies, except as recited in the claims. It is intended that no part of this specification be construed to effect a disavowal of any part of the full scope of the disclosed technologies. Although certain embodiments of the present disclosure have been described, these embodiments likewise are not intended to limit the full scope of the disclosed technologies.

While specific embodiments and applications of the disclosed technologies have been illustrated and described, it is to be understood that the disclosed technologies are not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the disclosed technologies disclosed herein without departing from the spirit and scope of the disclosed technologies. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of hardware processors, e.g., microprocessors, microcontrollers, field programmable gate arrays (FPGAs), application specific integrated circuits (ASICs), and/or System on a Chip (SoC)—but such implementation decisions should not be interpreted as causing a departure from the scope of the disclosed technologies.

The steps of a method or algorithm described in connection with the embodiments disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the disclosed technologies. In other words, unless a specific order of steps or actions is required for proper operation of the embodiment, the order and/or use of specific steps and/or actions may be modified without departing from the scope of the disclosed technologies.

What is claimed is:

1. A method comprising:
   (a) receiving a first packet, from a first computing resource at a second computing resource, wherein the first computing resource and the second computing resource are among a plurality of computing resources of a computing system, the first packet comprising:
      (i) first data, and
      (ii) data specifying instructions for the second computing resource to
         write the first data to memory associated with the second computing resource, and
         notify a notification target computing resource from among the plurality of computing resources of the computing system once the first data has been written to the memory associated with the second computing resource;
   (b) writing, by the second computing resource, the first data to the memory associated with the second computing resource;
   subsequent to the first data having been written to the memory associated with the second computing resource,
      (c) transmitting a response packet, by the second computing resource to the notification target computing resource, the response packet comprising data specifying that the first data has been written to memory associated with the second computing resource; and
      (d) transmitting a second packet, by the second computing resource to a third computing resource from among the plurality of computing resources, the second computing resource being chained between the first computing resource and the third computing resource, wherein each of the first packet and the second packet comprises
   (iii) second data, and
   (iv) data specifying instructions for the third computing resource to
      write the second data to memory associated with the third computing resource, and
      notify a second notification target computing resource from among the plurality of computing resources when the second data has been written to the memory associated with the third computing resource.

2. The method of claim 1, wherein the notification target computing resource is the first computing resource.

3. The method of claim 1, wherein the notification target computing resource is a fourth computing resource that is different from the first computing resource.

4. The method of claim 1, wherein
   the first computing resource is an intermediary computing resource chained between an originator computing resource and the second computing resource, the originator computing resource having provided to the first computing resource at least the first data and additional data, and
   each of the first packet received by the second computing resource from the first computing resource and the response packet transmitted by the second computing resource to the notification target computing resource further comprises data specifying that the additional data has been written to memory associated with the first computing resource.

5. The method of claim 1, wherein each of the first packet and the second packet comprises data specifying an instruction for the third computing resource to notify the second notification target computing resource that the first data has been written to the memory associated with the second computing resource.

6. The method of claim 1, wherein each of the notification target computing resource and the second notification target computing resource is the first computing resource.

7. The method of claim 1, wherein each of the notification target computing resource and the second notification target computing resource is different from the first computing resource.

8. The method of claim 1, wherein the data specifying that the first data has been written to memory associated with the second computing resource specifies that the first data will have or has been written to a memory location associated with the second computing resource before that memory location is next read and/or side effects of the data which will have or has been written to the memory are utilized.

9. The method of claim 1, wherein the writing of the first data to the memory associated with the second computing resource comprises queueing the first data for writing or committing the writing.

10. The method of claim 1, wherein the plurality of computing resources of the computing system comprises one or more controllers of one or more processing devices included in the computing system, a plurality of processing engines of the one or more processing devices, and one or more memory controllers of cluster memory of the one or more processing devices.

11. The method of claim 1, wherein both the first packet and the response packet comprise
   additional data, and
   data specifying an instruction for the notification target computing resource to write the additional data to memory associated with the notification target computing resource.

12. (Original The method of claim 1, wherein the response packet comprises an address corresponding to the memory associated with the second computing resource to which the first data has been written.

13. The method of claim 12, wherein the first packet comprises the address corresponding to the memory associated with the second computing resource to which the first data is to be written.

14. A computing apparatus comprising:
one or more hardware processors; and
non-transitory computer-readable medium encoding instructions that, when executed by the one or more hardware processors, cause the computing apparatus to perform operations comprising:
(a) receive a first packet, from a first computing apparatus communicatively coupled with the computing apparatus, the first packet comprising
(i) first data, and
(ii) data specifying instructions to
write the first data to memory associated with the computing apparatus, and
notify a notification target computing apparatus communicatively coupled with the computing apparatus once the first data has been written to the memory associated with the computing apparatus;
(b) write the first data to the memory associated with the computing apparatus; subsequent to the first data having been written to the memory associated with the computing apparatus,
(c) transmit a response packet to the notification target computing apparatus, the response packet comprising data specifying that the first data has been written to memory associated with the computing apparatus; and
(d) transmit a second packet to a third computing apparatus communicatively coupled with the computing apparatus,
wherein each of the first packet and the second packet comprises
(iii) second data, and
(iv) data specifying instructions for the third computing apparatus to
write the second data to memory associated with the third computing apparatus, and
notify a second notification target computing apparatus when the second data has been written to the memory associated with the third computing apparatus.

15. The computing apparatus of claim 14, wherein the notification target computing apparatus is the computing apparatus.

16. The computing apparatus of claim 14, wherein the notification target computing apparatus is a fourth computing apparatus that is different from the first computing apparatus.

17. The computing apparatus of claim 14, wherein
each of the first packet and the response packet further comprises data specifying that additional data has been written to memory associated with the first computing apparatus, and
the additional data has been provided to the first computing apparatus by an originator computing apparatus.

18. The computing apparatus of claim 14, wherein each of the first packet and the second packet comprise data specifying an instruction for the third computing apparatus to notify the second notification target computing apparatus that the first data has been written to the memory associated with the computing apparatus.

19. The computing apparatus of claim 14, wherein each of the notification target computing apparatus and the second notification target computing apparatus is the first computing resource.

20. The computing apparatus of claim 14, wherein each of the notification target computing apparatus and the second notification target computing apparatus is different from the first computing apparatus.

21. The computing apparatus of claim 14, wherein the data specifying that the first data has been written to memory associated with the computing apparatus specifies that the first data will have or has been written to a memory location associated with the computing apparatus before that memory location is next read and/or side effects of the data which will have or has been written to the memory are utilized.

22. The computing apparatus of claim 14, wherein the operation of writing the first data to the memory associated with the computing apparatus comprises queueing the first data for writing or initiate the writing.

23. The computing apparatus of claim 14 is configured either as a controller of a processing device included in a computing system, a processing engine of the processing device, or a memory controller of cluster memory of the processing device.

24. The computing apparatus of claim 14, wherein both the first packet and the response packet comprise
additional data, and
data specifying an instruction for the notification target computing apparatus to write the additional data to memory associated with the notification target computing apparatus.

25. The computing apparatus of claim 14, wherein the response packet comprises an address corresponding to the memory associated with the computing apparatus to which the first data has been written.

26. The computing apparatus of claim 25, wherein the first packet comprises the address corresponding to the memory associated with the computing apparatus to which the first data is to be written.

27. A computing system comprising:
a plurality of computing resources; and
memory associated with respective ones of the computing resources,
wherein a first computing resource of the plurality of computing resources is communicatively coupled with a second computing resource of the plurality of computing resources, the second computing resource is communicatively coupled with a third computing resource and a notification target computing resource of the plurality of computing resources, and the third computing resource is communicatively coupled with a second notification target computing resource of the plurality of computing resources,
wherein the second computing resource is configured to
(a) receive a first packet from the first computing resource, the first packet comprising
(i) first data, and
(ii) data specifying instructions to
write the first data to memory associated with the second computing resource, and
notify the notification target computing resource once the first data has been written to the memory associated with the second computing resource;
(b) write the first data to the memory associated with the second computing resource;

subsequent to the first data having been written to the memory associated with the second computing resource,
(c) transmit a response packet to the notification target computing resource, the response packet comprising data specifying that the first data has been written to memory associated with the second computing resource; and
(d) transmit a second packet to the third computing resource,
wherein each of the first packet and the second packet comprises
(iii) second data, and
(iv) data specifying instructions for the third computing resource to
write the second data to memory associated with the third computing resource, and
notify the second notification target computing resource when the second data has been written to the memory associated with the third computing resource.

28. The computing system of claim 27, wherein the notification target computing resource is the first computing resource.

29. The computing system of claim 28, wherein
the first computing resource is a first processing engine of a plurality of processing engines of the computing system, and
the second computing resource is a memory controller of cluster memory of the computing system.

30. The computing system of claim 27, wherein the notification target computing resource is a fourth computing resource that is different from the first computing resource.

31. The computing system of claim 30, wherein
the first computing resource is a first processing engine of a plurality of processing engines of the computing system,
the second computing resource is a memory controller of cluster memory of the computing system, and
the fourth computing resource is a second processing engine of the plurality of processing engines.

32. The computing system of claim 27, wherein
the first computing resource is an intermediary computing resource that is communicatively coupled with an originator computing resource from among the plurality of computing resources, the originator computing resource having provided to the first computing resource at least the first data and additional data, and
each of the first packet and the response packet further comprises data specifying that the additional data has been written to memory associated with the first computing resource.

33. The computing system of claim 32, wherein each of the first computing resource and the second computing resource is a respective memory controller of a respective cluster memory of the computing system.

34. The computing system of claim 27, wherein each of the first packet and the second packet comprise data specifying an instruction for the third computing resource to notify the second notification target computing resource that the first data has been written to the memory associated with the second computing resource.

35. The computing system of claim 27, wherein each of the notification target computing resource and the second notification target computing resource is the first computing resource.

36. The computing system of claim 27, wherein each of the notification target computing resource and the second notification target computing resource is different from the first computing resource.

37. The computing system of claim 27, wherein the data specifying that the first data has been written to memory associated with the second computing resource specifies that the first data will have or has been written to a memory location associated with the second computing resource before that memory location is next read and/or side effects of the data which will have or has been written to the memory are utilized.

38. The computing system of claim 27, wherein, to write the first data to the memory associated with the second computing resource, the second computing resource is configured to queue the first data for writing or initiate the writing.

39. The computing system of claim 27, wherein both the first packet and the response packet comprise
additional data, and
data specifying an instruction for the notification target computing resource to write the additional data to memory associated with the notification target computing resource.

40. The computing system of claim 27, wherein the response packet comprises an address corresponding to the memory associated with the second computing resource to which the first data has been written.

41. The computing system of claim 40, wherein the first packet comprises the address corresponding to the memory associated with the second computing resource to which the first data is to be written.

42. The computing system of claim 27, wherein the plurality of computing resources of the computing system comprises one or more controllers of one or more processing devices included in the computing system, a plurality of processing engines of the one or more processing devices, and one or more memory controllers of cluster memory of the one or more processing devices.

43. The computing system of claim 27, wherein at least a portion thereof is implemented as a system on a chip (SoC).

44. The computing system of claim 27, wherein at least one computing resource of the plurality of computing resources is implemented as a microprocessor, a microcontroller, a field programmable gate array (FPGA) or an application specific integrated circuit (ASIC).

* * * * *

UNITED STATES PATENT AND TRADEMARK OFFICE
CERTIFICATE OF CORRECTION

PATENT NO. : 9,864,519 B2
APPLICATION NO. : 14/834249
DATED : January 9, 2018
INVENTOR(S) : Doug B. Meyer, Jerry Coffin and Andy White Page 1 of 1

It is certified that error appears in the above-identified patent and that said Letters Patent is hereby corrected as shown below:

In the Claims

Column 42, Line 30, in Claim 5, delete "claim 1 ," and insert -- claim 1, -- therefor.

Column 43, Line 1, in Claim 12, delete "(Original The" and insert -- The -- therefor.

Signed and Sealed this
First Day of May, 2018

Andrei Iancu
*Director of the United States Patent and Trademark Office*